(12) United States Patent
Miyachi

(10) Patent No.: US 10,606,232 B2
(45) Date of Patent: Mar. 31, 2020

(54) CONTROLLER SYSTEM AND CONTROL METHOD

(71) Applicant: FANUC CORPORATION, Yamanashi (JP)

(72) Inventor: Motoyoshi Miyachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/636,011

(22) Filed: Jun. 28, 2017

(65) Prior Publication Data

US 2018/0004182 A1 Jan. 4, 2018

(30) Foreign Application Priority Data

Jun. 29, 2016 (JP) ................................. 2016-128493

(51) Int. Cl.
*G05B 19/05* (2006.01)
(52) U.S. Cl.
CPC .... *G05B 19/052* (2013.01); *G05B 2219/1105* (2013.01)
(58) Field of Classification Search
CPC .................................................... G05B 19/052
USPC ........................................................... 700/19
See application file for complete search history.

(56) References Cited

U.S. PATENT DOCUMENTS

| | | | | |
|---|---|---|---|---|
| 5,870,301 A * | 2/1999 | Yakushiji | ............ | G06F 11/0757 700/3 |
| 2002/0023117 A1* | 2/2002 | Bernardin | ............... | G06F 9/465 718/104 |
| 2005/0091410 A1* | 4/2005 | Gibart | ...................... | G05B 9/03 709/248 |
| 2006/0259160 A1* | 11/2006 | Hood | .................. | G05B 19/4188 700/20 |
| 2007/0277023 A1* | 11/2007 | Weiberle | ............. | G06F 9/30181 712/229 |
| 2008/0197797 A1* | 8/2008 | El-Ibiary | ................... | H02P 5/00 318/567 |
| 2008/0208361 A1* | 8/2008 | Grgic | ............... | G05B 19/41865 700/2 |
| 2009/0171472 A1* | 7/2009 | Teranisi | ................... | G05B 9/03 700/3 |

(Continued)

FOREIGN PATENT DOCUMENTS

| | | |
|---|---|---|
| CN | 101131575 A | 2/2008 |
| CN | 102169332 A | 8/2011 |

(Continued)

*Primary Examiner* — Robert E Fennema
*Assistant Examiner* — Santosh R Poudel
(74) *Attorney, Agent, or Firm* — Hauptman Ham, LLP

(57) ABSTRACT

A PLC system includes a plurality of I/O devices each connecting a control target of each of a plurality of PLCs to each of the plurality of PLCs, and a PC. Each one of the plurality of PLCs stores first output data obtained by executing a self-assigned program to control the control target connected to each PLC, and stores second output data obtained when the PC or another PLC executes another program allocated to the PC or the other PLC to control the control target connected to the one PLC. Each of the plurality of PLCs outputs one of the first output data and the second output data to the I/O device connected to each PLC based on selection information transmitted from the PC.

13 Claims, 15 Drawing Sheets

(56) References Cited

U.S. PATENT DOCUMENTS

| | | | | |
|---|---|---|---|---|
| 2013/0111456 A1* | 5/2013 | Bonnell | ............ | G06F 9/44536 |
| | | | | 717/170 |
| 2013/0282148 A1* | 10/2013 | Koyama | ............ | G05B 19/4185 |
| | | | | 700/56 |
| 2014/0005805 A1* | 1/2014 | Nishiyama | ............ | G06F 9/544 |
| | | | | 700/74 |
| 2015/0277406 A1* | 10/2015 | Maturana | ............ | G05B 19/0423 |
| | | | | 700/83 |
| 2016/0274552 A1* | 9/2016 | Strohmenger | ......... | G05B 11/01 |
| 2016/0381127 A1* | 12/2016 | Gibson | ............ | H04L 43/10 |
| | | | | 709/219 |
| 2017/0075335 A1* | 3/2017 | Takeuchi | ............ | G05B 19/056 |
| 2018/0095441 A1* | 4/2018 | Nakagawa | ............ | G05B 19/052 |

FOREIGN PATENT DOCUMENTS

| | | |
|---|---|---|
| CN | 103941648 A | 7/2014 |
| CN | 105393241 A | 3/2016 |
| EP | 3088971 A1 | 11/2016 |
| JP | H6-266685 A | 9/1994 |
| JP | 2001-337725 A | 12/2001 |
| JP | 2004-362133 A | 12/2004 |
| JP | 2010-250435 A | 11/2010 |
| JP | 2013168090 A | 8/2013 |

\* cited by examiner

CONTROLLER SYSTEM AND CONTROL METHOD

CROSS-REFERENCE TO RELATED APPLICATION

This application is based upon and claims the benefit of priority from Japanese Patent Application No. 2016-128493 filed on Jun. 29, 2016, the contents of which are incorporated herein by reference.

BACKGROUND OF THE INVENTION

Field of the Invention

The present invention relates to a controller system that includes a plurality of controllers and a higher level control device that controls and manages the plurality of controllers, and a control method.

Description of the Related Art

Japanese Laid-Open Patent Publication No. 2013-168090 (referred to as JP2013-168090A below) discloses a multi-controller system that includes a plurality of PLCs (programmable logic controllers) used as industrial devices, and a shared server that manages the plurality of PLCs. Each of the plurality of PLCs is connected with a control target of each PLC via an I/O (Input/Output) device. Further, when detecting an abnormal PLC, the shared server of the multi-controller system selects a PLC of a small load, i.e., a PLC that can execute an additional program. Then, the selected PLC is made to load a program executed by the PLC determined as an abnormal PLC and execute the program in place of the abnormal PLC.

SUMMARY OF THE INVENTION

Generally, data such as an input/output signal of an I/O device (I/O equipment) is stored in a main memory in a PLC. Hence, when an abnormality occurs in a given PLC and when another PLC takes over the control of a control target which has been controlled by the PLC in which an abnormality has occurred, the other PLC needs to output data that does not contradict execution results obtained so far, to the I/O device connected to the control target of the abnormal PLC. Hence, the given PLC needs to copy data stored in the main memory as is to the other PLC that takes over the control.

This I/O (input/output) signal and the like have a large size of several hundreds of kilobytes to several megabytes. Hence, when data is copied from the main memory of the PLC in which the abnormality has occurred to the other PLC via the Ethernet (registered trademark), a copy time substantially exceeds one execution cycle of the PLC for executing the program. Therefore, it is not possible to continue controlling the control target. Further, when an abnormality occurs in a control unit of a PLC, reliability of data stored in a main memory is also low. Therefore, it is not preferable to copy this data to the other PLC, and continue controlling the control target of the PLC in which the abnormality has occurred.

Therefore, a technique disclosed in above JP2013-168090A cannot avoid probabilities of interruption of the control of the control target or an output of data that contradicts the execution results obtained so far to the control target when the control of the control target is switched to the other PLC.

It is therefore an object of the present invention to provide a controller system and a control method that can switch control subjects for a control target while continuing controlling the control target in a stable state.

A first aspect of the present invention is a controller system: a plurality of controllers; a plurality of I/O devices each configured to connect and transmit necessary information between a control target of each of the plurality of controllers and each of the plurality of controllers; and a higher level control device configured to control and manage the plurality of controllers, the higher level control device includes a storage unit configured to store a plurality of programs to be executed by each of the plurality of controllers, and a processor configured to allocate the plurality of programs stored in the storage unit as self-assigned programs for respective controllers to cause each of the plurality of controllers to control the control target connected to itself via the I/O device, and further allocate all or part of the plurality of programs stored in the storage unit as other programs to the higher level control device and the plurality of controllers to have the all or part of the plurality of programs be doubly executed in parallel in one execution cycle, and each one of the plurality of controllers includes a communication unit including a first input buffer memory configured to store input data transmitted from the control target connected to the one controller via the I/O device, a first output buffer memory configured to store first output data obtained by executing the self-assigned program allocated to the one controller to control the control target connected to the one controller via the I/O device, and a second output buffer memory configured to store second output data obtained when the higher level control device or another controller executes the other program allocated to the higher level control device or the other controller to control the control target connected to the one controller via the I/O device, and the one controller is configured to output one of the first output data and the second output data to the control target connected to the one controller via the I/O device, based on selection information transmitted from the higher level control device, wherein the first output data is stored in the first output buffer memory, the second output data is stored in the second output buffer memory.

According to this configuration, even when control subjects for controlling the control target are switched, it is possible to output the output data that does not contradict execution results obtained so far, to the I/O device connected to the control target. Consequently, while continuing controlling the control target in the stable state, it is possible to switch the control subjects for the control target.

The first aspect of the present invention is the controller system, and each one of the plurality of controllers may further include a processor configured to generate the first output data by executing the self-assigned program allocated to the one controller based on the input data transmitted from the control target connected to the one controller via the I/O device, and generate the second output data by executing the other program allocated to the one controller based on the input data transmitted from the control target connected to another one of the controllers via another I/O device and controlled according to the other program allocated to the one controller. In this manner, the one controller can execute the program (the self-assigned program or the other program) based on the input data transmitted from any control target, generate the output data outputted to the control target that has transmitted the input data, and control the control target in the stable state.

The first aspect of the present invention is the controller system, and the processor of the higher level control device may be configured to generate the second output data by executing the other program allocated to the higher level control device based on the input data transmitted from the control target controlled according to the other program allocated to the higher level control device. Consequently, the higher level control device can execute the other program based on the input data transmitted by the control target, generate the output data outputted to the control target that has transmitted the input data, and control the control target in the stable state.

The first aspect of the present invention is the controller system, and the processor of the higher level control device may be configured to output the selection information to the plurality of controllers to cause one of the controllers determined as a normal controller to output the first output data stored in the first output buffer memory to the control target connected to the normal controller via the I/O device, and cause another of the controllers determined as an abnormal controller to output the second output data stored in the second output buffer memory to the control target connected to the abnormal controller via the I/O device. Accordingly, even when an abnormality occurs in the controller, in place of the controller determined as the abnormal controller, the other normal controller can control the control target connected to the controller determined as the abnormal controller. Consequently, while continuing controlling the control target connected to the controller determined as the abnormal controller in the stable state, it is possible to switch the control subjects of the control target connected to the controller determined as the abnormal controller.

The first aspect of the present invention is the controller system, and the processor of the higher level control device may be configured to determine whether each of the plurality of controllers is normal or abnormal based on at least one of error information and a survival signal of each of the plurality of controllers obtained from the plurality of controllers. Consequently, the higher level control device can precisely determine whether the controller is normal or abnormal.

The first aspect of the present invention is the controller system, and the communication unit of the controller may further include a selector configured to select one of the first output data and the second output data as output data based on the selection information, wherein the first output data is stored in the first output buffer memory, the second output data is stored in the second output buffer memory, and the output data is outputted to the control target connected to each controller via the I/O device. Consequently, it is possible to easily switch the output data outputted to the I/O device.

The first aspect of the present invention is the controller system, and the processor of the higher level control device may be configured to obtain load information via the communication unit of the plurality of controllers and allocate the other program based on the obtained load information, wherein the load information indicates a load applied when each of the plurality of controllers executes the self-assigned program. Consequently, it is possible to allocate the other program such that each of the plurality of controllers finishes processing of the program in one execution cycle.

The first aspect of the present invention is the controller system, and the higher level control device may be configured to receive the input data stored in the first input buffer memory of the one controller connected via the I/O device to the control target controlled according to the other program allocated to the higher level control device, and transmit the second output data to the one controller connected via the I/O device to the control target controlled according to the other program allocated to the higher level control device. Consequently, the higher level control device can transmit to the controller the second output data that does not contradict the execution results obtained so far, and control the control target connected to the PLC via the I/O device.

The first aspect of the present invention is the controller system, and the each one of the plurality of controllers may further include a second input buffer memory configured to store the input data transmitted from the control target connected to another one of the controllers via the I/O device and controlled according to the other program allocated to the one controller, and a third output buffer memory configured to store the second output data obtained by executing the other program allocated to the one controller to control the control target connected to the other one of the controllers via the I/O device, and is configured to receive the input data via the higher level control device, wherein the input data is stored in the first input buffer memory of the other one of the controllers connected via the I/O device to the control target controlled according to the other program allocated to the one controller, store the received input data in the second input buffer memory, and transmit the second output data to the other one of the controllers via the higher level control device, wherein the second output data is stored in the third output buffer memory, and the other one of the controllers is connected via the I/O device to the control target controlled according to the other program allocated to the one controller. Consequently, the one controller can transmit to the other controller the second output data that does not contradict the execution results obtained so far, and control the control target connected to the other controller via the I/O device.

A second aspect of the present invention is a control method of a controller system that includes: a plurality of controllers; a plurality of I/O devices configured to connect a control target of each of the plurality of controllers to each of the plurality of controllers, and transmit necessary information between the control target and each of the controllers; and a higher level control device configured to control and manage the plurality of controllers, the higher level control device includes a storage unit configured to store each of a plurality of programs executed by each of the plurality of controllers, and each of the plurality of controllers includes a communication unit including a first input buffer memory, a first output buffer memory and a second output buffer memory, and the control method includes: an allocating step of, at the higher level control device, allocating each of the plurality of program stored in the storage unit as a self-assigned program to each of the plurality of controllers to cause each of the plurality of controllers to control the control target connected to each controller via the I/O device, and further allocating all or part of the plurality of programs as another program to the higher level control device and the plurality of controllers to cause the higher level control device and the plurality of controllers to doubly execute the all or part of the plurality of programs stored in the storage unit in parallel in one execution cycle; and a first inputting/storing step of, at each one of the plurality of controllers, storing input data in the first input buffer memory, wherein the input data is transmitted from the control target connected to the one controller via the I/O device; a first outputting/storing step of, at the one controller, storing first output data in the first output buffer memory, wherein the first output data is obtained by executing the self-assigned program allocated to the one controller to control the control target connected to the one controller via the I/O device; a second outputting/storing step, at the one controller, storing second output data in the second output buffer memory, wherein the second output data is obtained when the higher level control device or another of the controllers executes the other program allocated to the higher level control device or the other controller to control the control target connected to the one controller via the I/O device; and an outputting step of, at the one controller, outputting one of the first output data and the second output data to the control target connected to the one controller via the I/O device, based on selection information transmitted from the higher level control device, wherein the first output data is stored in the first output buffer memory, the second output data is stored in the second output buffer memory.

According to this configuration, even when the control subject that controls the control target is switched, it is possible to output the output data that does not contradict the execution results obtained so far, to the I/O device connected to this control target. Consequently, while continuing controlling the control target in the stable state, it is possible to switch the control subject of the control target.

The second aspect of the present invention is the control method, and may further include: a first generating step of, at the one controller, generating the first output data by executing the self-assigned program allocated to the one controller based on the input data transmitted from the control target connected to the one controller via the I/O device; a second generating step of, at the one controller, generating the second output data by executing the other program allocated to the one controller based on the input data transmitted from the control target connected to another one of the controllers via the I/O device and controlled according to the other program allocated to the one controller; and a third generating step of, at the higher level control device, generating the second output data by executing the other program allocated to the higher level control device based on the input data transmitted from the control target controlled according to the other program allocated to the higher level control device. Consequently, the controller can execute the program (the self-assigned program or the other program) based on the input data transmitted by the control target, generate the output data outputted to the control target that has transmitted the input data, and control the control target in the stable state. Further, the higher level control device can execute the other program based on the input data transmitted by the control target, generate the output data outputted to the control target that has transmitted the input data, and control the control target in the stable state.

The second aspect of the present invention is the control method, the communication unit may further include a selector, and the control method may further include an abnormality determining step of, at the higher level control device, determining whether each of the plurality of controllers is normal or abnormal based on at least one of error information and a survival signal of the each of the plurality of controllers obtained from the plurality of controllers; and a selecting/outputting step of, at the higher level control device, outputting the selection information to the plurality of controllers to cause one of the controllers determined as a normal controller to output the first output data stored in the first output buffer memory to the control target connected to the normal controller via the I/O device, and cause another of the controllers determined as an abnormal controller to output the second output data stored in the second output buffer memory to the control target connected to the abnormal controller via the I/O device; and a selecting step of, at the selector of the communication unit of each of the plurality of controllers, selecting one of the first output data and the second output data as output data based on the selection information, wherein the first output data is stored in the first output buffer memory, the second output data is stored in the second output buffer memory, and the output data is outputted to the control target connected to each controller via the I/O device. Consequently, the higher level control device can precisely determine whether the controller is normal or abnormal. Further, even when an abnormality occurs in the controller, in place of the controller determined as the abnormal controller, another normal controller can control the control target connected to the controller determined as the abnormal controller. Consequently, while continuing controlling the control target connected to the controller determined as the abnormal controller in the stable state, it is possible to switch the control subjects of the control target connected to the controller determined as the abnormal controller. Further, the communication unit can easily switch the output data outputted to the I/O device.

The second aspect of the present invention is the control method, and may include an obtaining step of, at the higher level control device, obtaining load information via the communication unit of the plurality of controllers, wherein the load information indicates a load applied when each of the plurality of controllers executes the self-assigned program, and, in the allocating step, the other program may be allocated based on the obtained load information. Consequently, it is possible to allocate the other program to cause each of the plurality of controllers to finish processing of the program in one execution cycle.

The second aspect of the present invention is the control method, and may further include: a receiving step of, at the higher level control device, receiving the input data stored in the first input buffer memory of the controller connected via the I/O device to the control target controlled according to the other program allocated to the higher level control device; and a first transmitting step of, at the higher level control device, transmitting the second output data to the controller connected via the I/O device to the control target controlled according to the other program allocated to the higher level control device. Consequently, the higher level control device can transmit to the controller the second output data that does not contradict the execution results obtained so far, and control the control target connected to the PLC via the I/O device.

The second aspect of the present invention is the control method, the communication unit may further include a second input buffer memory and a third output buffer memory, the control method may further include: a second inputting/storing step of, at the one controller, storing the input data in the second input buffer memory, wherein the input data is transmitted from the control target connected to the other controller via the I/O device and controlled according to the other program allocated to the one controller; and a third outputting/storing step of, at the one controller, storing the second output data in the third output buffer memory, wherein the second output data is obtained by executing the other program allocated to the one controller to control the control target connected to the other controller via the I/O device; and a second transmitting step of, at the one controller, transmitting the second output data stored in the third output buffer memory to the other controller via the higher level control device, and the other controller is connected via the I/O device to the control target controlled according to the other program allocated to the one controller, and, in the second inputting/storing step, the one controller may be configured to receive the input data via the higher level control device, wherein the input data is stored in the first input buffer memory of the other controller connected via the I/O device to the control target controlled according to the other program allocated to the one controller, and store the received input data in the second input buffer memory. Consequently, the one controller can transmit to the other controller the second output data that does not contradict the execution results obtained so far, and control the control target connected to the other controller via the I/O device.

According to the present invention, even when control subjects that controls the control target are switched, it is possible to output the output data that does not contradict execution results obtained so far, to the I/O device connected to this control target. Consequently, while continuing controlling the control target in the stable state, it is possible to switch the control subject of the control target.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a controller system and a control method according to the present invention will be described in detail below with reference to the accompanying drawings.

Figure 1:
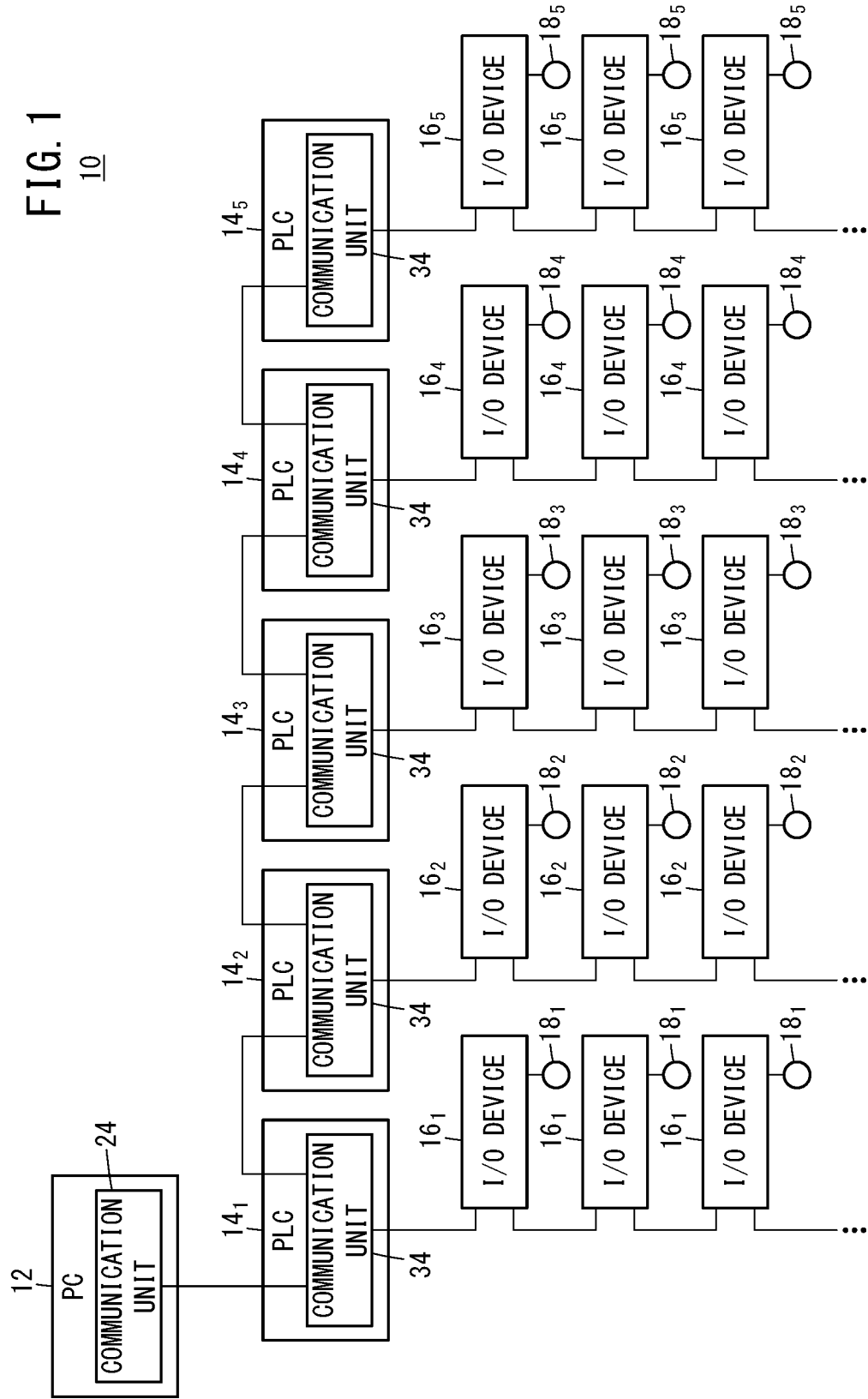
FIG. 1 is an entire schematic configuration diagram of a PLC system according to an embodiment.

FIG. 1 is an entire schematic configuration diagram of a PLC (controller) system 10 according to the embodiment. The PLC system 10 includes a PC 12 that is a higher level control device, a plurality of (five in the present embodiment) PLCs (programmable logic controllers) $14_n$ (n=1, 2, . . . and 5) that are connected with the PC 12 by a daisy chain, and a plurality of I/O devices (external signal input/output devices) $16_n$ that are respectively connected to a plurality of PLCs $14_n$ (PLC $14_1$ to PLC $14_5$) connected by the daisy chain. The plurality of I/O devices $16_n$ are connected with control targets $18_n$ of the plurality of PLCs $14_n$. That is, the plurality of I/O devices $16_n$ connect the control targets $18_n$ of the plurality of PLCs $14_n$, to the plurality of PLCs $14_n$, and transmit necessary information (data) between the control targets $18_n$ and the PLCs $14_n$.

In this description, $16_1$ represents the plurality of I/O devices $16_n$ connected to the PLC $14_1$ by the daisy chain. Similarly, $16_2$ to $16_5$ represent the plurality of I/O devices $16_n$ connected to the PLCs $14_2$ to $14_5$, respectively, by the daisy chain. $18_1$ represents the control target $18_n$ connected to the I/O devices $16_1$. Similarly, $18_2$ to $18_5$ represent the control targets $18_n$ connected to the I/O devices $16_2$ to $16_5$. Hence, the control targets $18_1$ are connected to the PLCs $14_1$ via the I/O devices $16_1$. Similarly, the control targets $18_2$ to $18_5$ are connected to the PLC $14_2$ to PLC $14_5$ via the I/O devices $16_2$ to $16_5$. The control targets $18_n$ are, for example, motors or pumps.

The PC 12, the plurality of PLCs $14_n$ and the plurality of I/O devices $16_n$ are connected by an EtherCAT (registered trademark) system. Hence, when transmitting data (signal), the PC 12 and the PLC $14_n$ write address information of the transmission destination PC or PLC $14_n$ and transmission data in a frame, and transmit them. When transmitting the data to the PLC $14_n$, the PC 12 transmits the frame in which address information of the transmission destination PLC $14_n$ and the transmission data are written, to the PLC $14_1$ connected to a subsequent stage of the PC 12. When the frame is sent from the PC 12 or the PLC $14_n$ connected to a previous stage, the PLC $14_n$ determines whether or not the frame has been transmitted based on the address information included in the frame. The PLC $14_n$ imports data written in the frame when determining that the transmitted frame is transmitted to itself, and transmits the frame transmitted as is to the PLC $14_n$ connected to a subsequent stage when determining that the frame is not transmitted to itself. The same applies to the case of data transmission from each PLC $14_n$ to the PC 12, the PLC $14_n$ transmits the frame addressed to the PC 12 transmitted from the subsequent stage to the PC 12 or the PLC $14_n$ connected to the previous stage. In this regard, transmission and reception between the PLCs $14_n$ are performed via the PC 12. When, for example, the PLC $14_2$ transmits data to the PLC $14_4$, the PLC $14_2$ sends the frame including the data to the PC 12 once, and then the PC 12 transmits the data to the PLC $14_4$.

Figure 2:
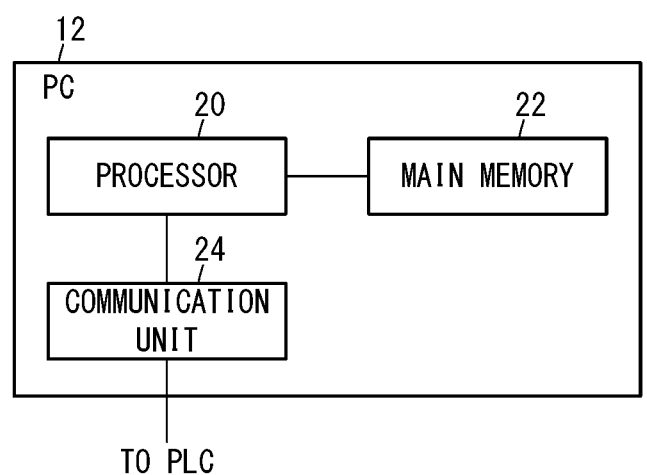
FIG. 2 is a schematic configuration diagram of a PC shown in FIG. 1.
Figure 3:
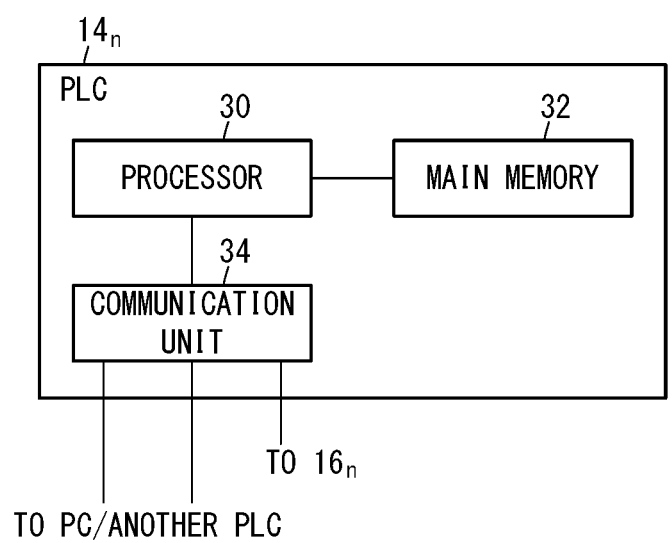
FIG. 3 is a schematic configuration diagram of a PLC shown in FIG. 1.

FIG. 2 is a schematic configuration diagram of the PC 12. FIG. 3 is a schematic configuration diagram of the PLC $14_n$. The PC 12 includes a processor 20 such as a CPU, a main memory (storage unit) 22 and a communication unit 24. The PLC $14_n$ includes a processor 30 such as a CPU, a main memory (storage unit) 32 and a communication unit 34. The communication units 34 of the plurality of these PLCs $14_n$ are connected with the communication unit 24 of the PC 12 by the daisy chain (see FIG. 1). The main memory 22 of the PC 12 stores a plurality of programs Pn executed (processed) by each of the plurality of PLCs $14_n$. These programs Pn are programs for controlling the control targets $18_n$. In this description, P1 represents the program Pn for controlling the control target $18_1$ connected to the PLC $14_1$ via the I/O device $16_1$. Similarly, P2 to P5 represent the programs Pn for controlling the control targets $18_2$ to $18_5$ connected to the PLCs $14_2$ to $14_5$ via the I/O devices $16_2$ to $16_5$.

The processor 20 of the PC 12 allocates the plurality of programs Pn (P1 to P5) stored in the main memory 22 to the PC 12 and the plurality of PLCs $14_n$ (PLC $14_1$ to $14_5$). The allocated programs Pn are loaded to the allocation tar get PLCs $14_n$. That is, the processor 20 transmits the program Pn via the communication unit 24. The processor 30 of the allocation target PLC $14_n$ obtains the allocated program Pn via the communication unit 34, and stores the programs Pn in the main memory 32.

An operation of allocating the program Pn in the PLC system 10 will be described in detail below with reference to a flowchart in FIG. 4.

Figure 5:
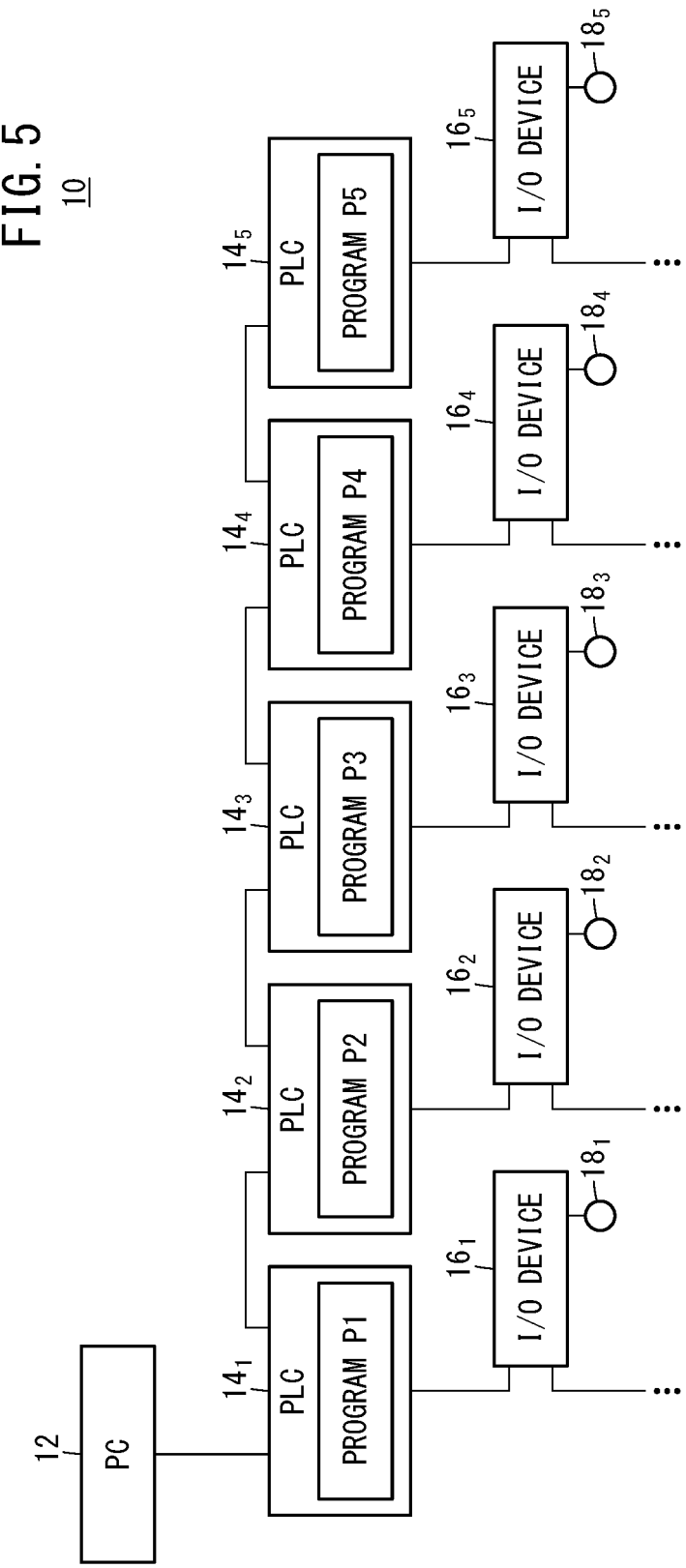
FIG. 5 is a view showing an example where all programs stored in a main memory shown in FIG. 2 are respectively allocated to a plurality of PLCs to cause each of the plurality of PLCs to control an I/O device connected to each of the plurality of PLCs.

During activation of the PLC system 10 or at a predetermined timing, the processor 20 of the PC 12 performs an operation of step S1. In step S1, the processor 20 allocates the plurality of programs Pn stored in the main memory 22 to the plurality of PLCs $14_n$ to cause each of the plurality of PLCs $14_n$ to control the control targets $18_n$ connected to itself via the I/O devices $16_n$. For ease of description, the program Pn allocated to the PLC $14_n$ to control the control target $18_n$ connected to the PLC $14_n$ via the I/O devices $16_n$ will be referred to as the self-assigned program Pn below. By this means, as shown in FIG. 5, the program P1 as the self-assigned program Pn is allocated to the PLC $14_1$. Similarly, the self-assigned programs P2 to P5 are allocated to the PLC $14_2$ to PLC $14_5$. The plurality of PLCs $14_n$ (PLC $14_1$ to PLC $14_5$) finish executing the self-assigned programs Pn (P1 to P5) in one execution cycle of the PLC $14_n$ (referred to as one execution cycle below).

Figure 6:
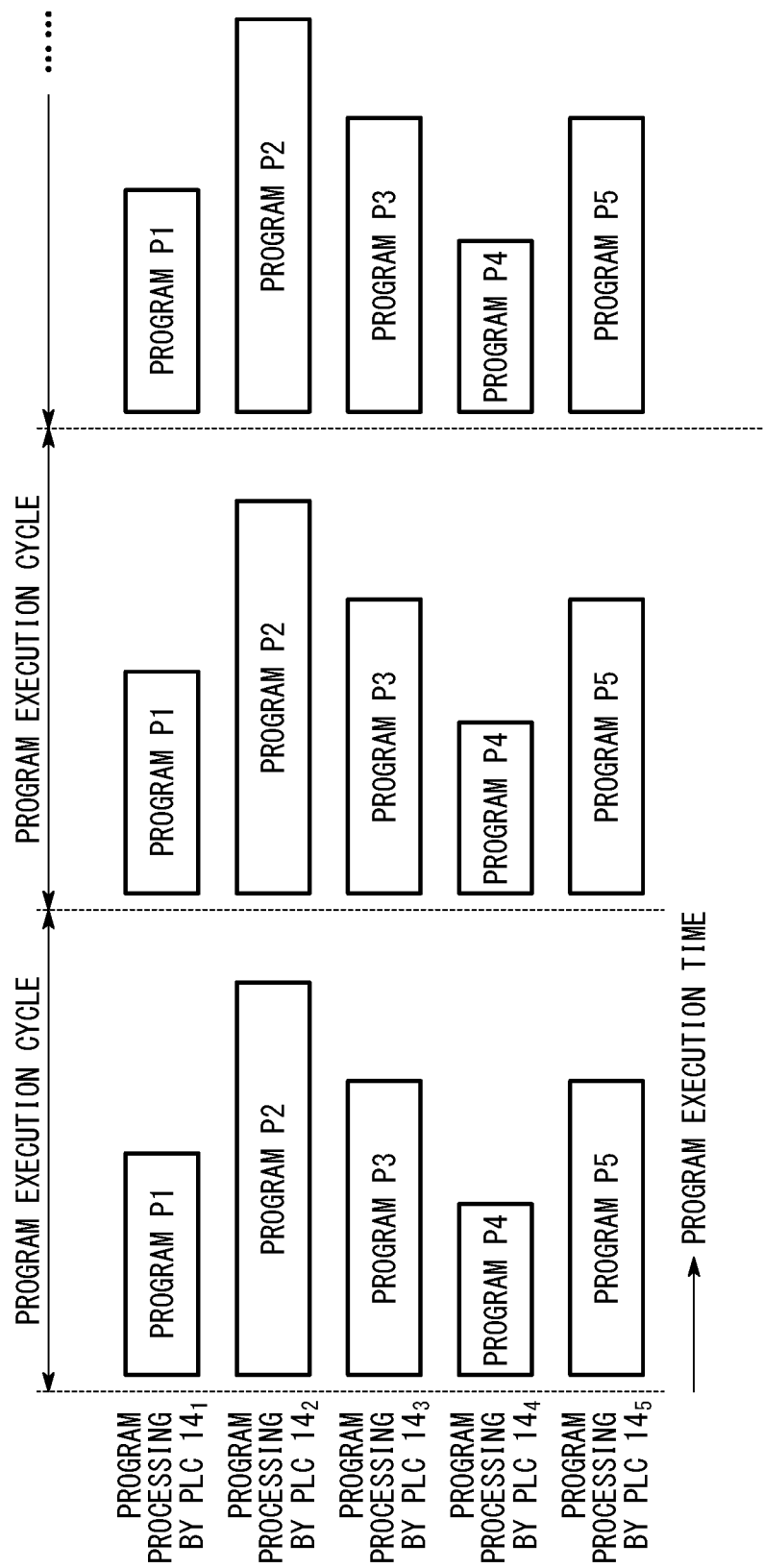
FIG. 6 is a time chart showing that each of the plurality of PLCs executes (processes) a self-assigned program (the allocated self-assigned program by the allocation shown in FIG. 5)

When data sizes (the number of steps) of these programs Pn (P1 to P5) are different from each other, times (execution times and processing times) taken to execute the programs Pn, and loads (or load factors) are also different from each other. In an example shown in FIG. 6, execution times and loads (or load factors) of the five programs Pn (P1 to P5) have a relationship of P4<P1<P3=P5<P2. Information indicating the load or the load factor will be referred to as load information. FIG. 6 is a time chart showing that each of the plurality of PLCs $14_n$ executes (processes) the self-assigned program Pn (the self-assigned program Pn allocated by the allocation shown in FIG. 5).

Next, as shown in FIG. 5, the processor 20 of the PC 12 loads the plurality of allocated self-assigned programs Pn (P1 to P5) to the plurality of PLCs $14_n$ ($14_1$ to $14_5$) (step S2).

Next, the processor 30 of each of the plurality of PLCs $14_n$ starts executing the self-assigned program Pn (step S3), calculates the load information resulting from execution of the self-assigned program Pn, and transmits the load information to the processor 20 of the PC 12 (step S4). When obtaining all pieces of load information of the processors 30 from the plurality of PLCs $14_n$ ($14_1$ to $14_5$), the processor 20 of the PC 12 causes the plurality of PLCs $14_n$ ($14_1$ to $14_5$) to stop executing all self-assigned programs Pn (step S5). The processor 20 causes the processors 30 of all the PLCs $14_n$ ($14_1$ to $14_5$) to stop executing the self-assigned programs Pn by outputting stop signals to the processors 30 of all PLCs $14_n$ ($14_1$ to $14_5$) via the communication unit 24 and the communication units 34.

The processor 20 further allocates all or part of the plurality of programs Pn to the PC 12 and the plurality of PLCs $14_n$ based on the load information of all PLCs $14_n$ ($14_1$ to $14_5$) collected in step S4 to cause the PC 12 and the plurality of PLCs $14_n$ to doubly execute all or part of the plurality of programs Pn stored in the main memory 22 in parallel in one execution cycle (step S6). Hence, the programs Pn for controlling the control targets $18_n$ other than the control targets $18_n$ connected to one PLC $14_n$ via the I/O device $16_n$, i.e., the control targets $18_n$ connected to the other PLCs $14_n$ via the I/O devices $16_n$ are allocated to the one PLC $14_n$. The program Pn is allocated to the PC 12, too, in some cases. In this case, the processor 20 allocates the programs Pn so as not to cause one PLC $14_n$ to execute the same program Pn twice. For ease of description, the programs Pn allocated to the PC 12 and the PLCs $14_n$ to control the control targets $18_n$ connected to the other PLCs $14_n$ via the I/O devices $16_n$ will be referred to as the other programs Pn below in some cases.

Figure 7:
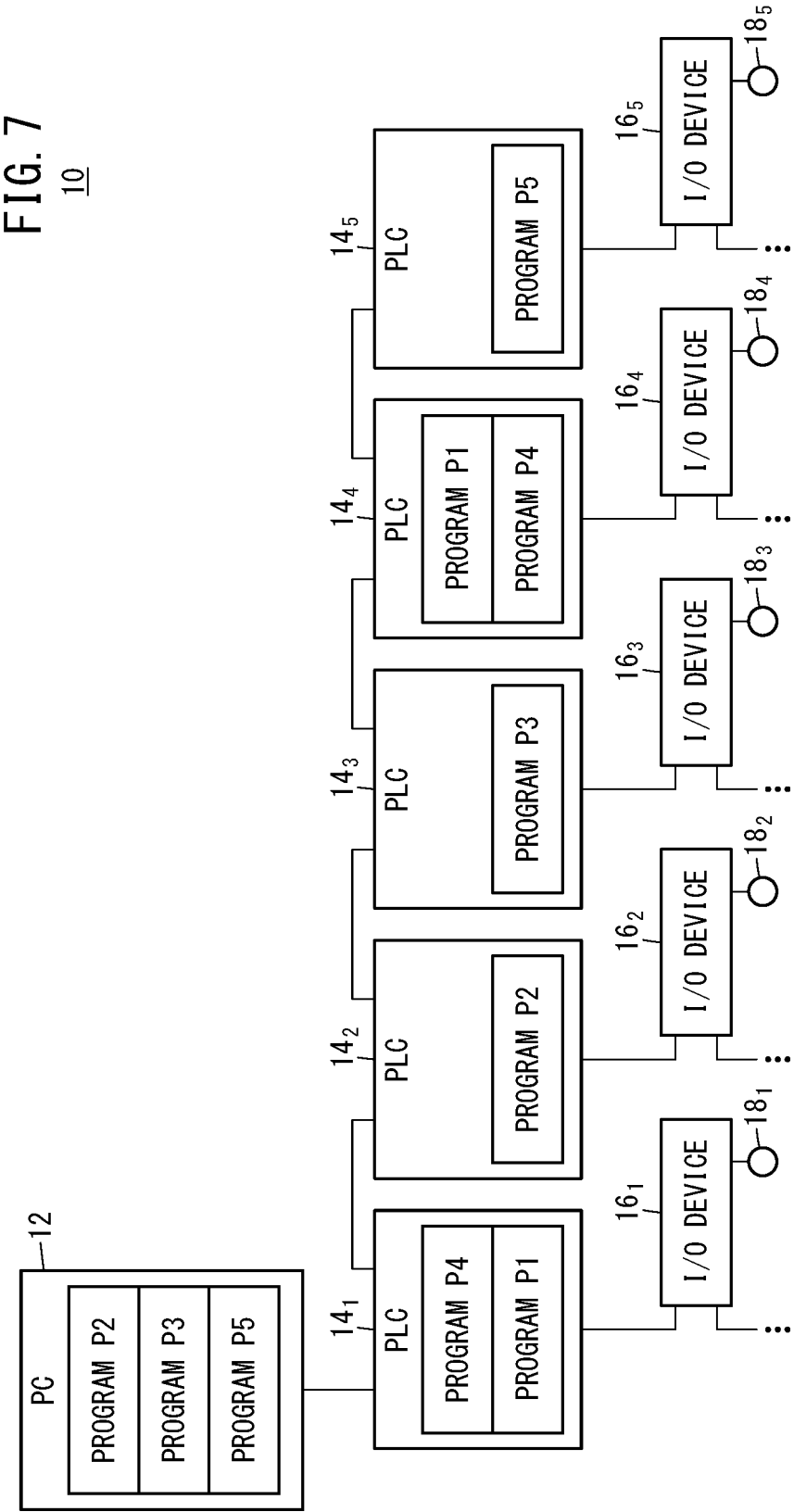
FIG. 7 is a view showing an example where all programs stored in the main memory shown in FIG. 2 are allocated to the PC and the plurality of PLCs to cause all the programs to be doubly executed in parallel in one execution cycle.
Figure 8:
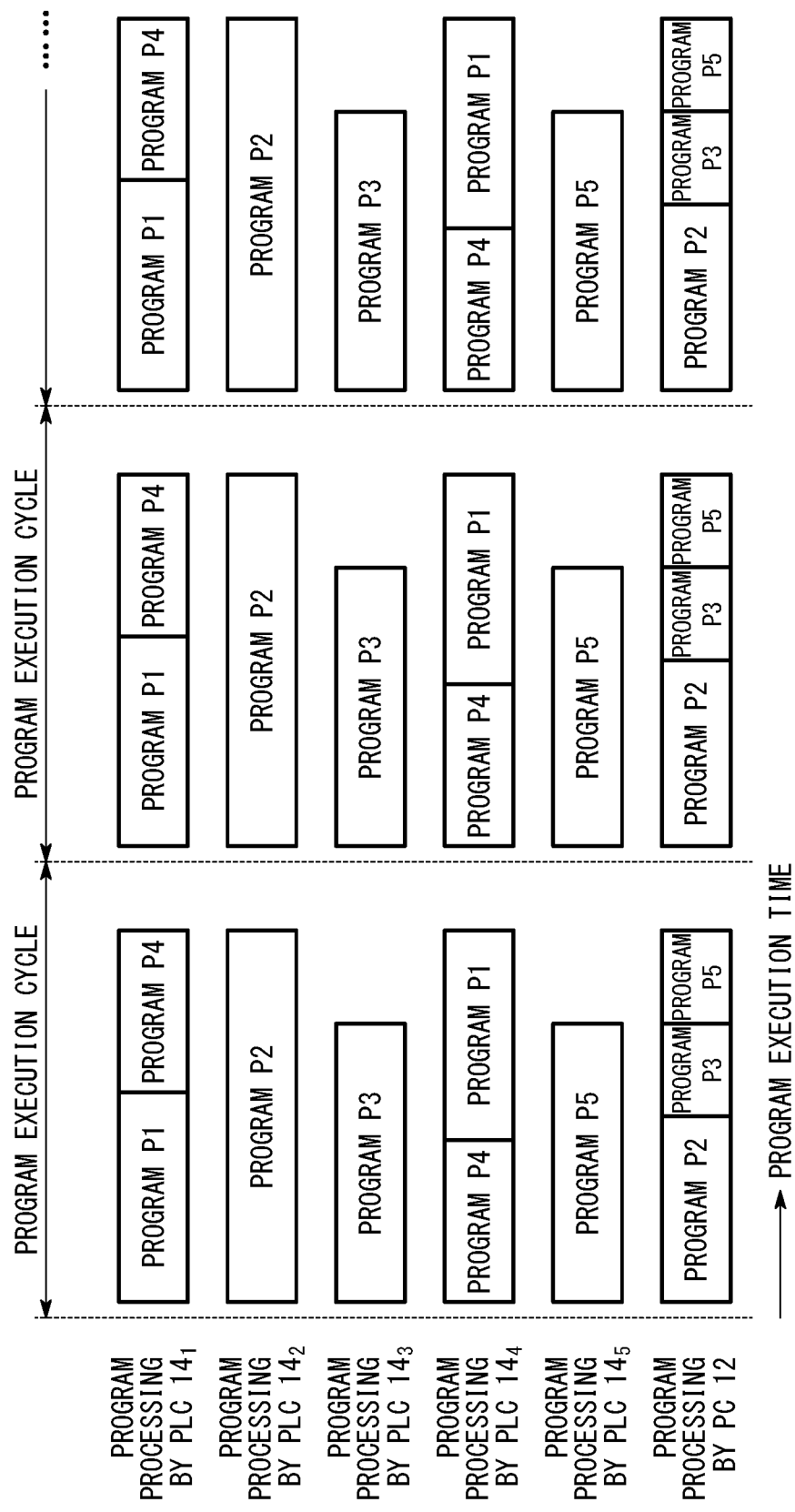
FIG. 8 is a time chart showing that each of the plurality of PLCs executes (processes) the program(s) (the self-assigned program and other programs allocated by the allocation shown in FIG. 7)

FIG. 7 is a view showing an example where all programs Pn (P1 to P5) are allocated to the PC 12 and the plurality of PLCs $14_n$ to cause the PC 12 and the plurality of PLCs $14_n$ to doubly execute all programs Pn (P1 to P5) stored in the main memory 22 in parallel in one execution cycle. FIG. 8 is a time chart showing that each of the plurality of PLCs $14_n$ executes (processes) the program Pn (the self-assigned program Pn and the other program Pn allocated by the allocation shown in FIG. 7). As shown in FIG. 7, the other program P4 is further allocated to the PLC $14_1$, and the other program P1 is further allocated to the PLC $14_4$. The other programs P2, P3, P5 that cannot be allocated to the PLC $14_n$ are allocated to the PC 12. Loads (or load factors) of the programs P2, P3, P5 allocated to the PLCs $14_2$, $14_3$, $14_5$ are high. Therefore, the other programs Pn are not additionally allocated to the PLCs $14_2$, $14_3$, $14_5$. Allocation of these other programs Pn will be described later in detail.

Next, as shown in FIG. 7, the processor 20 of the PC 12 causes the plurality of PLCs $14_n$ (PLC $14_1$, PLC $14_4$) to load the other programs Pn (P4, P1) allocated to the plurality of PLCs $14_n$ ($14_1$, $14_4$) (step S7). The processor 20 may cause the plurality of PLCs $14_n$ to load the allocated self-assigned programs Pn again, while having the plurality of PLCs $14_n$ load the other allocated programs Pn.

The PC 12 and the plurality of PLCs $14_n$ ($14_1$ to $14_5$) execute the allocated programs Pn (including the self-assigned programs Pn and the other programs Pn) (step S8). In this case, FIG. 8 shows that the PLCs $14_n$ ($14_1$, $14_4$) execute the self-assigned programs Pn (P1, P4) and then execute the other programs Pn (P4, P1). However, an execution order of the programs Pn may be reverse.

Next, processing of allocating the other programs Pn in step S6 will be described in detail. Lpmax represents a maximum load that is applicable to the processor 20 of the PC 12 in one execution cycle. Lmax represents a maximum load that is applicable to the processor 30 of each PLC $14_n$ in one execution cycle. The processing performance of the processor 30 of each PLC $14_n$ is the same. The processing performance of the processor 20 of the PC 12 is higher than the processing performances of the processors 30 of the PLCs $14_n$. Hence, Lpmax>Lmax holds. Ln (L1 to L5) represents a load that is applied during execution of the programs Pn (P1 to P5). Lpc represents a unique load that is applied in one execution cycle of the processor 20 of the PC 12. This load Ln (L1 to L5) is based on load information of each PLC $14_n$ collected in step S4 in FIG. 4. The load factor of the PLC $14_n$ takes a value obtained by dividing the load applied to the PLC $14_n$ by the maximum load Lmax. For example, the load factor of the load applied during execution of the program P1 is L1/Lmax. Similarly, load factors of loads applied during execution of the programs P2 to P5 are L2/Lmax, L3/Lmax, L4/Lmax and L5/Lmax.

First, taking into account the priorities of the programs Pn executed in parallel, the programs Pn of higher priorities are allocated in order. In the present embodiment, the priorities are in order of P1→P2→P3→P4→P5, and the programs Pn are allocated as the other programs Pn in this order to the other PLCs $14_n$ ($14_1$ to $14_5$).

Figure 4:
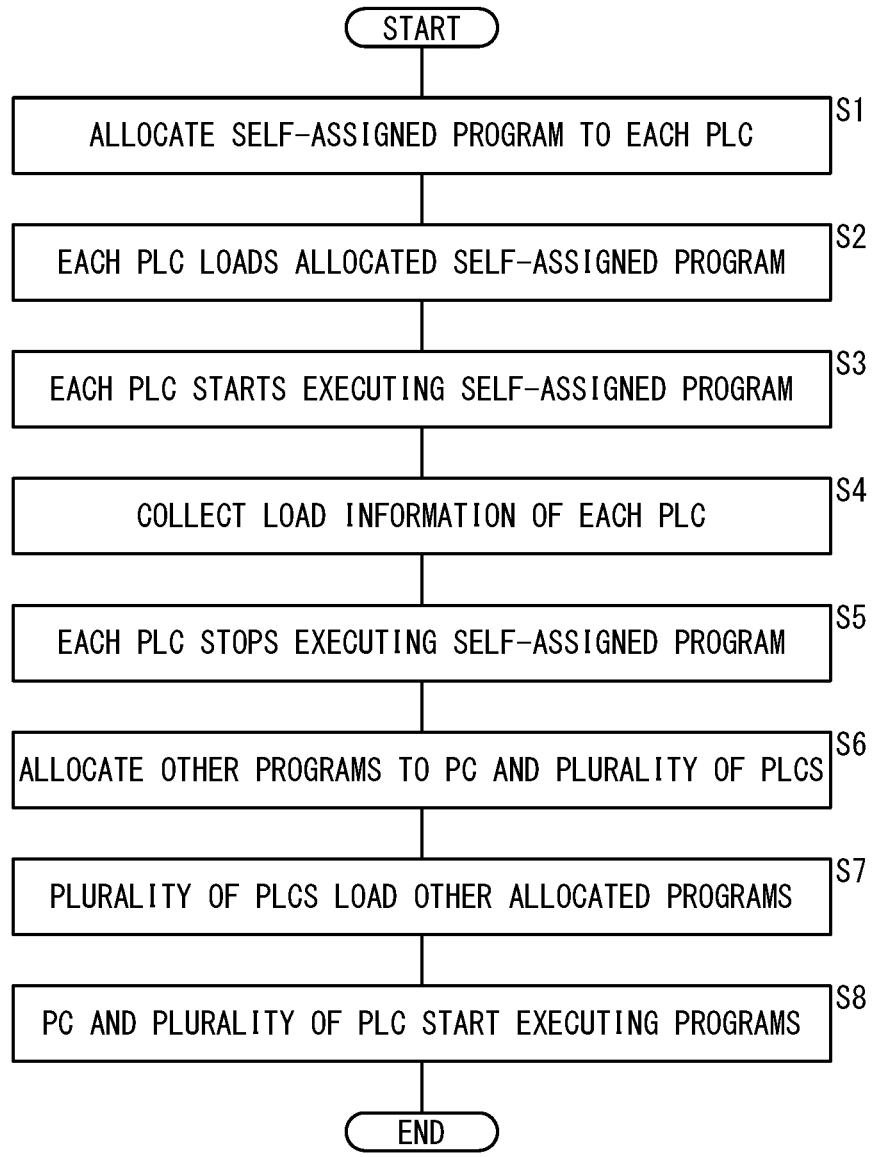
FIG. 4 is a flowchart showing a program allocating operation of the PLC system.
Figure 9:
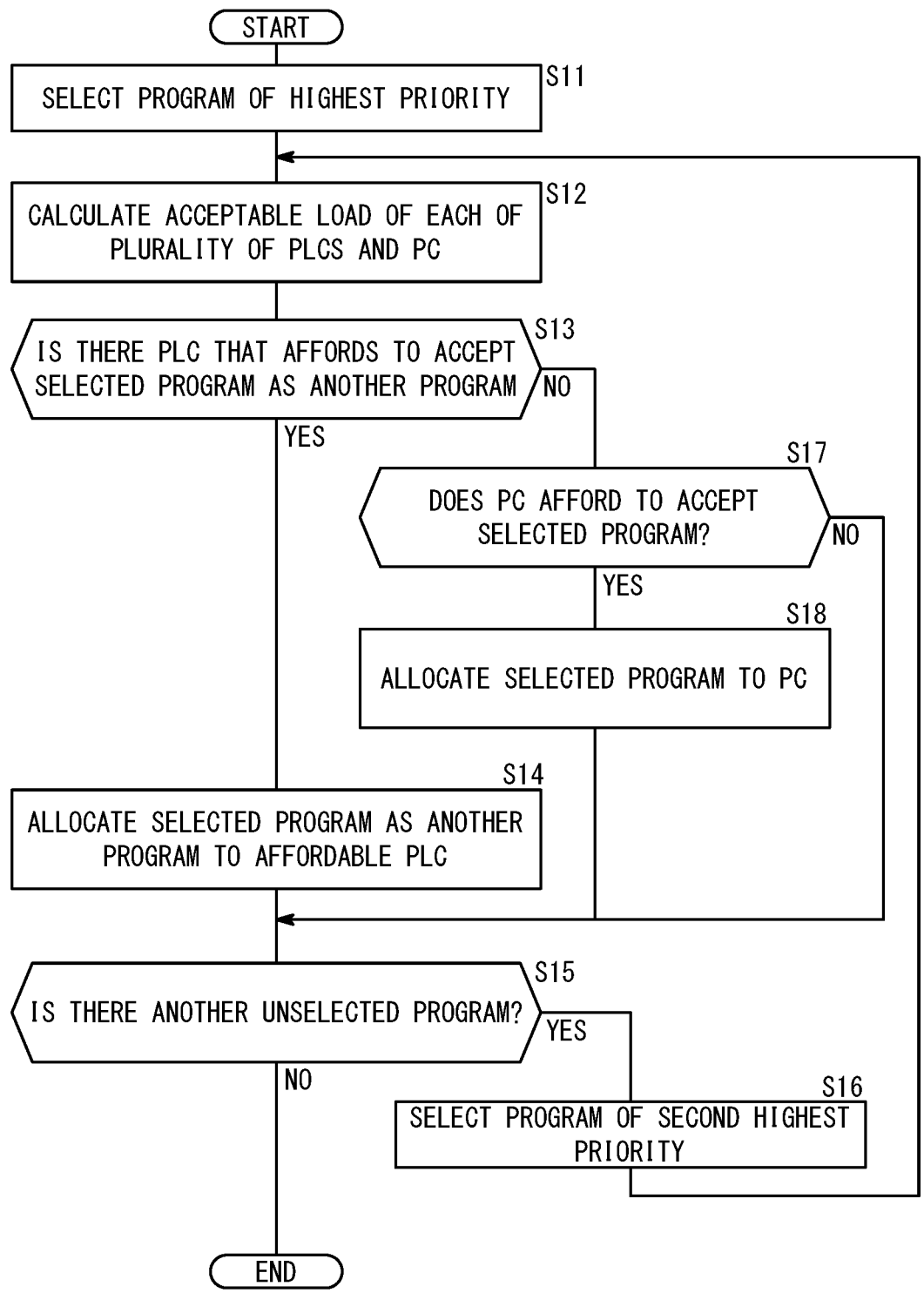
FIG. 9 is a sub flowchart showing a processing operation in step S6 in FIG. 4.

FIG. 9 is a sub flowchart showing a processing operation in step S6 in FIG. 4. First, the processor 20 of the PC 12 selects a program of the highest priority (step S11). In the present embodiment, the priorities are in order of P1→P2→P3→P4→P5. Therefore, the processor 20 selects the program P1 in step S11.

Next, the processor 20 calculates an acceptable load of the PC 12 and each of the plurality of PLCs $14_n$ ($14_1$ to $14_5$) by using the load information of each PLC $14_n$ collected in step S4 in FIG. 4 (step S12). This acceptable load is a load that can be further processed in one execution cycle. The processor 20 calculates an acceptable load of the PC 12 and each of the plurality of PLCs $14_n$ ($14_1$ to $14_5$) based on the program Pn currently allocated to the PC 12 and each of the plurality of PLCs $14_n$ ($14_1$ to $14_5$). At this time, no program Pn is allocated to the PC 12, and only the self-assigned programs Pn are allocated to the plurality of PLCs $14_n$.

Hence, the load applicable to the PC 12 (referred to as an acceptance load LLp below) is LLp=Lpmax-Lpc. A load applicable to the PLC $14_1$ (referred to as an acceptance load LL1) is LL1=Lmax-L1. Similarly, loads applicable to the PLCs $14_2$ to the PLCs $14_5$ (referred to as acceptance loads LL2 to LL5) are LL2=Lmax-L2, LL3=Lmax-L3, LL4=Lmax-L4, and LL5=Lmax-L5.

The processor 20 determines whether or not there is the PLC $14_n$ that affords to accept the currently selected program P1 as the other program P1 (step S13). In the present embodiment, LL2<L1, LL3<L1, LL4>L1 and LL5<L1 hold (see FIG. 8). Therefore, the processor 20 determines that the PLC $14_4$ affords to accept the program P1 as the other program P1.

The program P1 is the self-assigned program P1 for the PLC $14_1$. Therefore, the processor 20 does not determine whether or not the PLC $14_1$ can accept the program P1. Further, even when there is the PLC $14_n$ that affords to accept the currently selected program Pn as the other program Pn, if the load factor of this PLC $14_n$ exceeds a threshold value (e.g., 90%) as a result of acceptance of the other program Pn, the processor 20 may determine that this PLC $14_n$ does not afford to accept the other program Pn.

When determining in step S13 that the PLC $14_4$ affords to accept the program P1, the processor 20 allocates the currently selected program P1 as the other program P1 to the PLCs $14_4$ (step S14), and the flow moves to step S15.

When the flow has moved to step S15, the processor 20 determines whether or not there is any program Pn that has not been selected yet. When determining in step S15 that there is any program Pn that has not been selected yet, the processor 20 newly selects the program Pn of the second highest priority (step S16), and the flow returns to step S12. By this means, the program Pn to be selected is switched from the program P1 to the program P2. That is, the program P2 is the second highest priority after the program P1. Therefore, at this time, the processor 20 newly selects the program P2 in step S16.

In step S12, as described above, the processor 20 calculates the acceptable acceptance loads LLp, LL1 to LL5 of the PC 12 and the plurality of PLCs $14_n$ ($14_1$ to $14_5$). The other program P1 has been allocated to the PLC $14_4$ in previous step S14, and therefore the acceptance load LL4 of the PLC $14_4$ is changed to LL4=Lmax-L4-L1. In this regard, the acceptance loads LL1 to LL3, LL5 of the other PLCs $14_1$ to $14_3$, $14_5$ remain the same, and the acceptance load LLp of the PC 12 also remains the same.

Next, in step S13, the processor 20 determines whether or not there is the PLC $14_n$ that affords to accept the currently selected program P2 as the other program P2. In the present embodiment, LL1<L2, LL3<L2, LL4<L2 and LL5<L2 hold (see FIG. 8). Therefore, the processor 20 determines that there is no PLC $14_n$ that affords to accept the program P2 as the other program P2.

In step S13, when determining that there is no PLC $14_n$ that affords to accept the program P2 as the other program P2, the processor 20 determines whether or not the PC 12 affords to accept the currently selected program P2 as the other program Pn (step S17). In the present embodiment, LLp>L2 holds (see FIG. 8). Therefore, the processor 20 determines that the PC 12 affords to accept the program P2 as the other program P2.

When determining in step S17 that the PC 12 affords to accept the program P2 as the other program P2, the processor 20 allocates the currently selected program P2 as the other program P2 to the PC 12 (step S18), and the flow moves to step S15. By repeating the above operation, the plurality of programs Pn (P1 to P5) are allocated as the other programs Pn (P1 to P5) to the PC 12 and the plurality of PLCs $14_n$ as shown in FIG. 7.

When determining in step S15 that there is no program Pn that has not yet been selected, the processor 20 ceases the processing, and the flow moves to step S7 in FIG. 4. When determining in step S17 that the PC 12 does not afford to accept the currently selected program Pn as the other program Pn, the flow then moves to step S15. By this means, any program Pn that is not accepted by the plurality of PLCs $14_n$ and the PC 12 as the other program Pn is not allocated to any one of the plurality of PLCs $14_n$ and the PC 12.

When determining in step S17 that the PC 12 does not afford to accept the currently selected program Pn as the other program Pn, the processor 20 may cease the processing, and the flow may move to step S7 in FIG. 4. When there is no priority among the programs Pn, the processor 20 may select the program Pn at random or in a predetermined order, and allocate the selected program Pn as the other program Pn to one of the plurality of PLCs $14_n$ and the PC 12.

Figure 10:
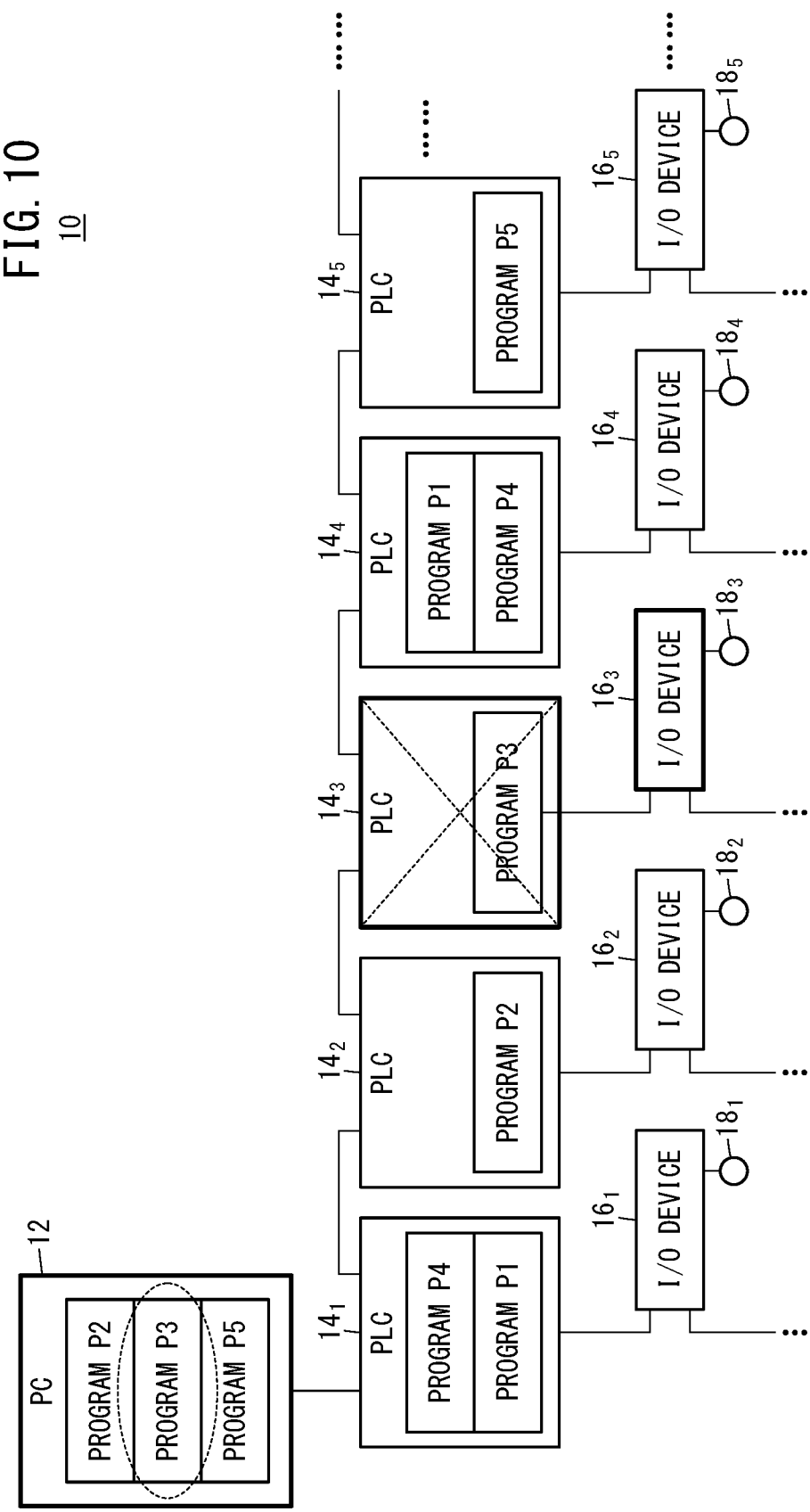
FIG. 10 is a view showing an example where, when an abnormality occurs in one of the plurality of PLCs, instead of the abnormal PLC, the PC controls an I/O device connected to the abnormal PLC.

Thus, the same program Pn is executed in parallel in one execution cycle. Consequently, even when an abnormality or a failure occurs in one PLC $14_n$, the other PLC $14_n$ that executes as the other program Pn the self-assigned program Pn of the one PLC $14_n$ in which the abnormality or the failure has occurred (also referred to as an abnormal PLC) can control the control target $18_n$ connected to the abnormal PLC $14_n$ via the I/O device $16_n$. When, for example, an abnormality (or a failure) occurs in the PLC $14_3$ as shown in FIG. 10, the PC 12 executes the self-assigned program P3 of the PLC $14_3$ as the other program P3. Consequently, it is possible for the PC 12 to control the control target $18_3$ connected to the abnormal PLC $14_3$ via the I/O device $16_3$. Consequently, while continuing controlling the control target $18_3$ in a stable state, it is possible to switch a subject that controls the control target $18_3$. Determination on whether or not there is the PLC $14_n$ in which an abnormality occurs will be described later.

Next, a configuration (main configurations of the communication units 34, 24 in particular) of the PLCs $14_n$ and the PC 12 will be specifically described with reference to FIGS. 11 and 12.

Figure 11:
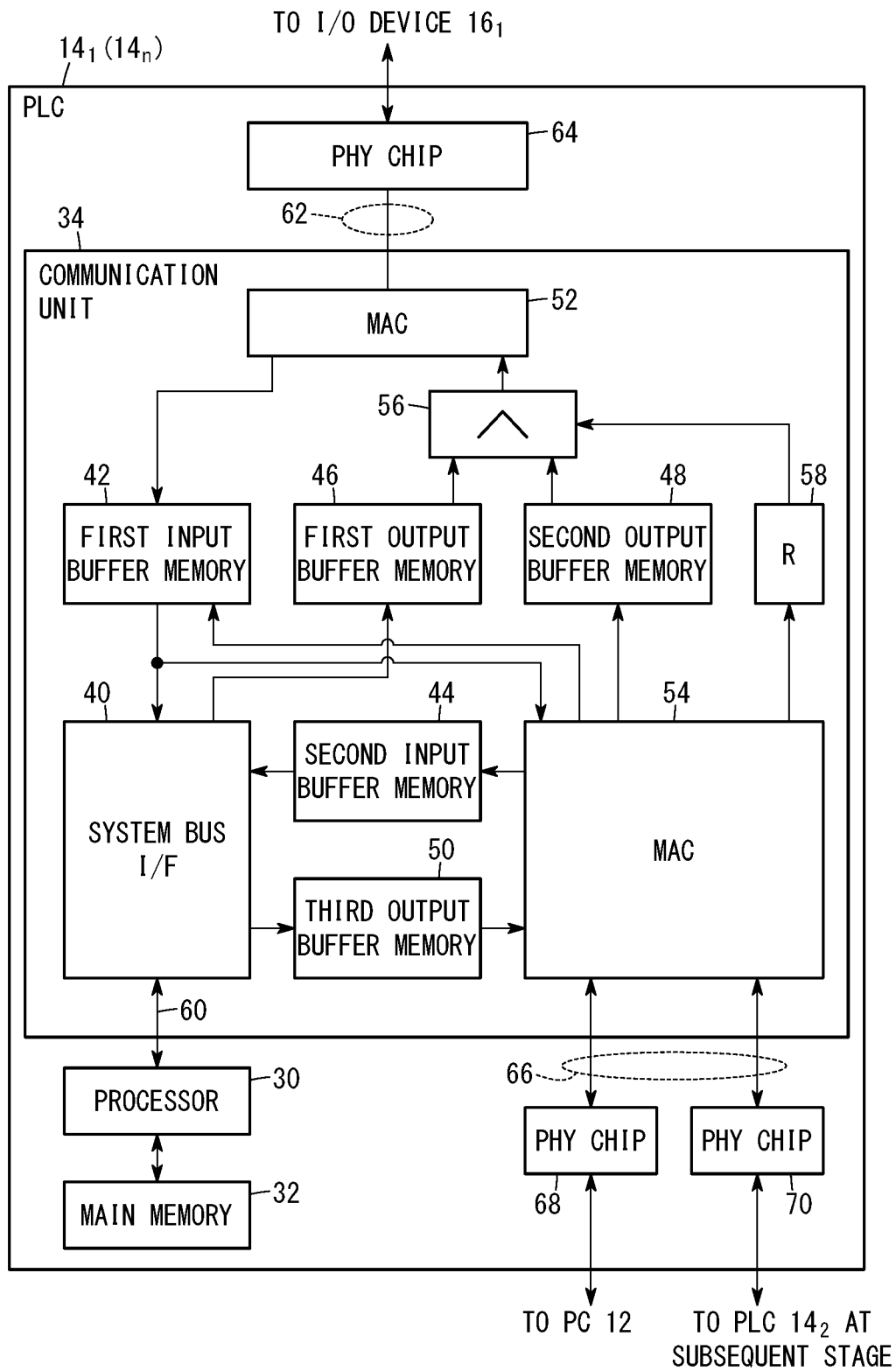
FIG. 11 is a detailed configuration diagram of the PLC shown in FIG. 3.

FIG. 11 is a detailed configuration diagram of the PLC $14_1$. Each PLC $14_n$ employs the same configuration. Therefore, the PLC $14_1$ will be described as an example hereinafter. The communication unit 34 of the PLC $14_1$ includes a system bus I/F 40 that communicates with the processor 30, a first input buffer memory 42, a second input buffer memory 44, a first output buffer memory 46, a second output buffer memory 48, a third output buffer memory 50, a MAC 52 that communicates with the I/O device $16_1$ connected to the PLC $14_1$, a MAC 54 that communicates with the PC 12 and the other PLCs $14_2$ than the PLC $14_1$, a selector 56, and a register 58.

The system bus I/F 40 and the processor 30 are connected via a system bus 60. The MAC 52 is connected with a PHY (physical layer) chip 64 via a MII (Media Independent Interface) 62. The communication unit 34 is connected with the I/O device $16_1$ of the PLC $14_1$ via this PHY chip 64. The MAC 54 is connected to PHY chips 68, 70 via the MII 66. The communication unit 34 is connected with the communication unit 24 of the PC 12 provided at a previous stage via the PHY chip 68, and is connected with the communication unit 34 of the other PLC provided at a subsequent stage (next stage) via the PHY chip 70. In a case of the PLCs $14_2$ to $14_5$, the PHY chips 68 are connected with the PLCs $14_1$ to $14_4$ not with the PC 12. Further, in a case of the PLC $14_5$ at the last stage, the PHY chip 70 is not connected to any of the PLC $14_n$.

The MAC 52 receives a frame including input data sent from the I/O device $16_1$ connected to the PLC $14_1$ via the PHY chip 64 and the like. This input data is transmitted from the control target $18_1$ connected to the I/O device $16_1$. The MAC 52 extracts the input data from the received frame, and stores the extracted input data in the first input buffer memory 42. The processor 30 of the PLC $14_1$ reads the input data stored in the first input buffer memory 42 via the system bus I/F 40 and the system bus 60, and stores the read input data in the main memory 32.

The processor 30 stores, in the main memory 32, output data (also referred to as first output data below) obtained by executing the self-assigned program P1 based on the input data stored in the main memory 32 (first input buffer memory 42). The processor 30 stores the first output data stored in the main memory 32, in the first output buffer memory 46 via the system bus 60.

The MAC 54 receives via the PC 12 a frame including input data sent from the I/O device $16_4$ connected to the PLC $14_4$ via the PHY chip 68. The input data sent from this I/O device $16_4$ is transmitted from the control target $18_4$ controlled according to the other program P4 (see FIG. 7) allocated to the PLC $14_4$. The MAC 54 extracts the input data from the received frame, and stores the extracted input data in the second input buffer memory 44. The processor 30 of the PLC $14_1$ reads the input data stored in the second input buffer memory 44 via the system bus I/F 40 and the system bus 60, and stores the read input data in the main memory 32. In this regard, when there are the plurality of other programs Pn allocated to the PLC $14_1$, the main memory 32 and the second input buffer memory 44 store input data per other program Pn (per I/O device $16_n$ or PLC $14_n$ that has outputted the input data).

The processor 30 stores, in the main memory 32, output data (also referred to as second output data below) obtained by executing the other program P4 based on the input data (the input data from the control target $18_4$) stored in the main memory 32 (second input buffer memory 44). The processor 30 stores the second output data stored in the main memory 32, in the third output buffer memory 50 via the system bus 60. In this regard, when there are the plurality of other program Pn allocated to the PLC $14_1$, the main memory 32 and the third output buffer memory 50 store the second output data per other program Pn (per I/O device $16_n$ or PLC $14_n$ that is a second output data output target).

The MAC 54 writes the second output data in the frame to transmit the second output data stored in the third output buffer memory 50 to the PLC $14_4$, and transmits the written frame to the PC 12 via the PHY chip 68. Address information of the transmission destination PLC $14_4$ is added to this frame. The PC 12 writes selection information to the received frame to transmit to the PLC $14_4$. The second output data included in this frame is stored in the second output buffer memory 48 of the PLC $14_4$, and the selection information is stored in the register 58 of the PLC $14_4$. By this means, the PLC $14_1$ can control the control target $18_4$ connected to the PLC $14_4$ via the I/O device $16_4$.

The selection information is information indicating which one of the first output data stored in the first output buffer memory 46 and the second output data stored in the second output buffer memory 48 is selected as output data outputted (transmitted) from the PLC $14_n$ to the I/O device $16_n$. In the present embodiment, this selection information is one-bit data. A logical value "0" of the selection information means that the PLC $14_n$ outputs the first output data stored in the first output buffer memory 46 to the I/O device $16_n$. A logical value "1" of the selection information means that the PLC $14_n$ outputs the second output data stored in the second output buffer memory 48 to the I/O device $16_n$.

To transmit the input data stored in the first input buffer memory 42 to the PLC $14_4$ to which the self-assigned program P1 allocated to the PLC $14_1$ has been allocated as the other program P1 (see FIG. 7), the MAC 54 writes this input data in the frame and transmits the written frame to the PC 12 via the PHY chip 68. Address information of the transmission destination PLC $14_4$ is added to this frame. The PC 12 transmits this received frame to the PLC $14_4$. The input data included in this frame is stored in the second input buffer memory 44 of the PLC $14_4$.

The MAC 54 receives through the PHY chip 68 the frame including the second output data sent via the PC 12 from the PLC $14_4$ to which the self-assigned program P1 allocated to the PLC $14_1$ has been allocated as the other program P1. This second output data transmitted from the PLC $14_4$ to the PLC $14_1$ is data stored in the third output buffer memory 50 of the PLC $14_4$. The MAC 54 extracts the second output data and the selection information from the received frame, and stores the extracted second output data in the second output buffer memory 48 and the extracted selection information in the register 58. Consequently, the PLC 14₄ can control the control target 18₁ connected to the PLC 14₁ via the I/O device 16₁.

The selector 56 selects one of the first output data stored in the first output buffer memory 46 and the second output data stored in the second output buffer memory 48 based on the selection information stored in the register 58, and transmits the selected one to the MAC 52. The selector 56 transmits the first output data to the MAC 52 in a case of the logical value "0" of the selection information, and transmits the second output data to the MAC 52 in a case of the logical value "1" of the selection information.

The MAC 52 writes in the frame the output data sent from the selector 56 and outputs (transmits) the written frame to the I/O device 16₁. The I/O device 16₁ extracts the output data from the sent frame, and outputs the extracted output data to the control target 18₁. Thus, the selector 56 and the register 58 can switch whether the PLC 14₁ or the PLC 14₄ controls the control target 18₁ connected to the PLC 14₁ via the I/O device 16₁.

The MAC 54 receives the frame via the PHY chip 68. However, when this frame is not addressed to the PLC 14₁, the MAC 54 transmits the received frame as is to the PLC 14₂ connected to a subsequent stage via the PHY chip 70. Similarly, the MAC 54 receives the frame via the PHY chip 70. However, when this frame is not addressed to the PLC 14₁, the MAC 54 transmits the received frame as is to the PC 12 connected to a previous stage via the PHY chip 68. That is, the MAC 54 extracts the input data or the second output data from the frame only in a case of the frame addressed to the PLC 14₁.

Figure 12:
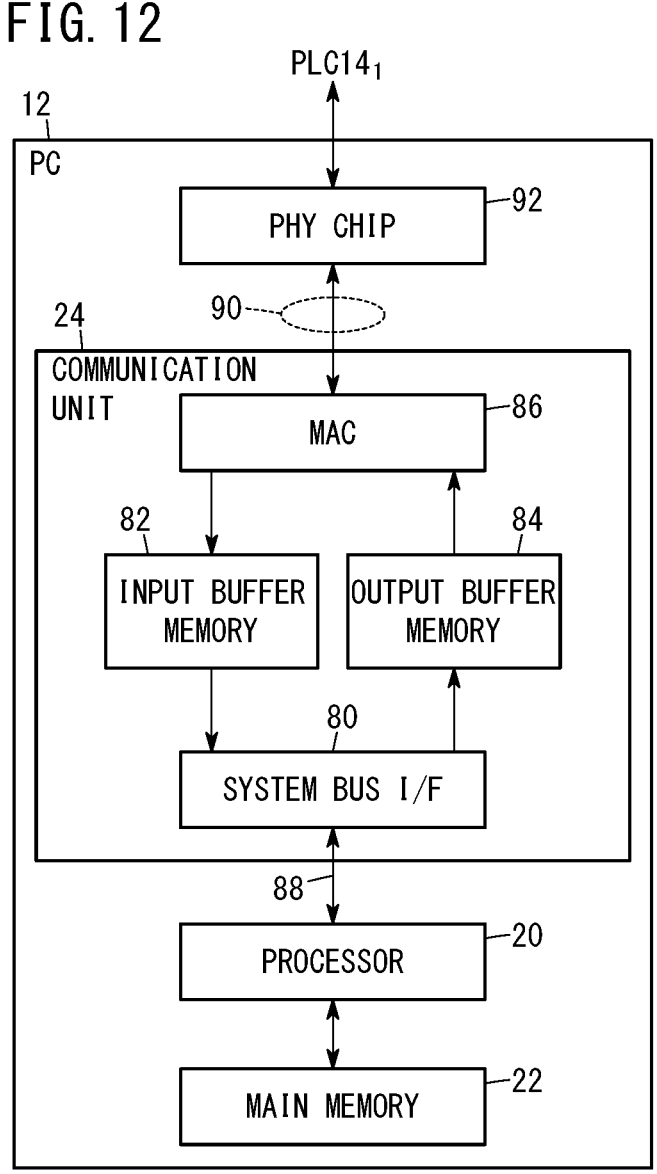
FIG. 12 is a detailed configuration diagram of the PC shown in FIG. 2.

FIG. 12 is a detailed configuration diagram of the PC 12. The communication unit 24 of the PC 12 includes a system bus I/F 80 that communicates with the processor 20, an input buffer memory 82, an output buffer memory 84 and a MAC 86 that communicates with the PLC 14₁.

The system bus I/F 80 and the processor 20 are connected by a system bus 88. The MAC 86 is connected with a PHY chip 92 via a MII 90. The communication unit 24 is connected with the communication unit 34 of the PLC 14₁ connected to a subsequent stage via the PHY chip 92.

The MAC 86 receives frames including items of input data sent from the plurality of PLCs 14ₙ (14₁ to 14₅), i.e., the plurality of I/O devices 16ₙ (16₁ to 16₅) via the PHY chip 92. These items of input data are sent from the plurality of control targets 18ₙ (18₁ to 18₅) connected to the plurality of PLCs 14ₙ via the plurality of I/O devices 16ₙ. The MAC 86 extracts at least the input data from the frame transmitted to the PC 12, and stores the extracted input data in the input buffer memory 82. The PLCs 14₂, 14₃, 14₅ connected to the control targets 18₂, 18₃, 18₅ controlled according to the other program P2, P3, P5 allocated to the PC 12 designate the PC 12 as the address information of the transmission destination and transmit the frame (the frame including the input data). The processor 20 of the PC 12 reads the input data stored in the input buffer memory 82 via the system bus I/F 80 and the system bus 88, and stores the read input data in the main memory 22. The main memory 22 and the input buffer memory 82 store the input data per PLC 14₂, 14₃, 14₅ that has transmitted the input data or per I/O device 16ₙ (per other program Pn).

The processor 20 stores in the main memory 22 the second output data obtained by executing the other program P2, P3, P5 based on the input data of each of the PLCs 14₂, 14₃, 14₅ (each of the I/O devices 16₂, 16₃, 16₅) stored in the main memory 22. The processor 20 stores the second output data stored in the main memory 22, in the output buffer memory 84 via the system bus 88 or the like. The main memory 22 and the output buffer memory 84 store the second output data per other program Pn (per PLC 14ₙ or per I/O device 16₂, 16₃, 16₅ that is a second output data output target).

The MAC 86 writes in the frame the second output data stored in the output buffer memory 84, and transmits the written frame to the PLCs 14₂, 14₃, 14₅ via the PHY chip 92. In this case, the MAC 86 writes the selection information, too, in the frame to be transmitted under control of the processor 20. Consequently, the PC 12 can control the I/O devices 16₂, 16₃, 16₅ connected to the PLCs 14₂, 14₃, 14₅. In this regard, the MAC 86 writes selection information in the frame including the second output data transmitted from one PLC 14ₙ to another PLC 14ₙ via the PC 12, too, and transmits the frame to the transmission destination PLC 14ₙ.

Figure 13:
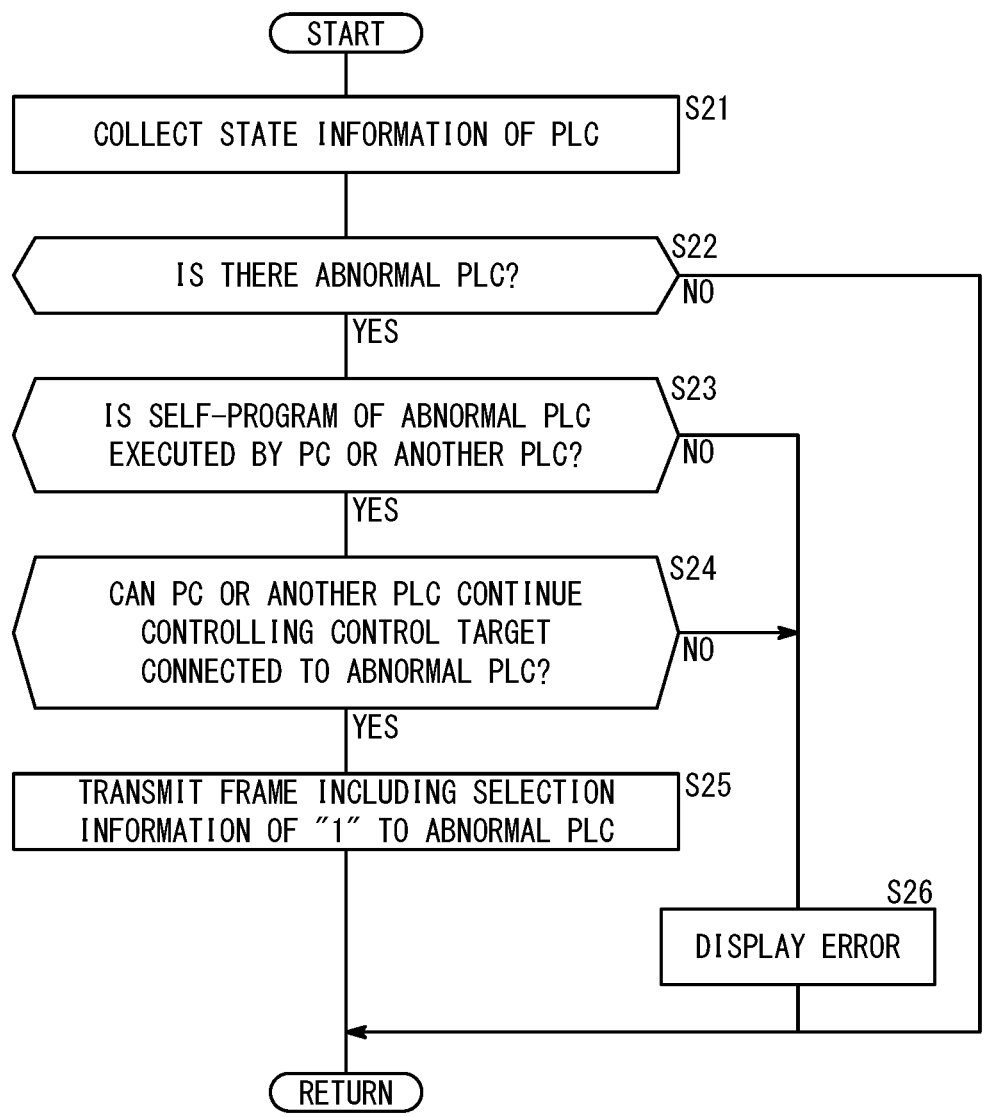
FIG. 13 is a flowchart showing processing of determining a logical value of selection information by the PC.

Next, processing of determining a logical value of selection information in the PC 12 will be described with reference to a flowchart in FIG. 13. The processing shown in FIG. 13 is performed per execution cycle. Principally, the processor 20 of the PC 12 writes the selection information of the logical value "0" in the frame transmitted to each PLC 14ₙ (14₁ to 14₅). In the present embodiment, the frame in which the selection information is written is the frame including second output data transmitted to each of the plurality of PLCs 14ₙ (PLCs 14₁ to 14₅). However, the frame in which the selection information is written may be a frame different from the frame including the second output data.

First, the processor 20 of the PC 12 collects state information sent from the plurality of PLCs 14ₙ (14₁ to 14₅) via the communication unit 24 and the communication units 34 of the plurality of PLCs 14ₙ (14₁ to 14₅) (step S21). The processor 30 of each of the plurality of PLCs 14ₙ (14₁ to 14₅) transmits state information such as a survival signal and error information to the PC 12 via a dedicated line that is not shown. When normally operating, the processor 30 of each of the plurality of PLCs 14ₙ (14₁ to 14₅) transmits the survival signal to the PC 12. This survival signal is transmitted per execution cycle. The error information is, for example, error information indicating a failure of the main memory 32 breaks down, and error information indicating disconnection with the control target 18ₙ connected to self (PLC 14ₙ) via the I/O device 16ₙ. When these errors occur, the PLC 14ₙ outputs the error information to the PC 12.

The processor 20 determines whether or not there is the abnormal PLC 14ₙ (the PLC 14ₙ in which an abnormality or a failure occurs) based on each collected state information (a survival signal or error information) of each of the plurality of PLCs 14ₙ (14₁ to 14₅) (step S22). When, for example, there is the PLC 14ₙ that does not output the survival signal, the processor 20 determines this PLC 14ₙ that does not output the survival signal as the abnormal PLC 14ₙ. Also, when there is the PLC 14ₙ that outputs the error information, the processor 20 determines this PLC 14ₙ that outputs the error information as the abnormal PLC 14ₙ.

In step S22, when determining that there is no abnormal PLC 14ₙ, the processor 20 finishes the processing. In this case, principally as described above, the PC 12 writes the selection information of the logical value "0" in the frame (the frame including the second output data), and transmits the frame to each of the plurality of PLCs 14ₙ (PLC 14₁ to 14₅).

Meanwhile, when determining in step S22 that there is an abnormal PLC 14ₙ, the processor 20 determines whether or not the self-assigned program Pn allocated to the abnormal PLC 14ₙ is executed in parallel by PC 12 or another normal PLC 14ₙ as the other program Pn (step S23). When the processor 20 determines in step S23 parallel execution by the PC 12 or the other PLC $14_n$, the flow moves to step S24.

When the flow moves to step S24, the processor 20 determines whether or not the PC 12 or the other PLC $14_n$ that executes the self-assigned program of the abnormal PLC $14_n$ as the other program can continuously control the control target $18_n$ connected to the abnormal PLC $14_n$ via the I/O device $16_n$. When, for example, the state information of the abnormal PLC $14_n$ includes error information of disconnection, the processor 30 determines that it is not possible to continuously control the control target $18_n$ connected to the abnormal PLC $14_n$. On the other hand, when the main memory 32 of the abnormal PLC $14_n$ simply breaks down or when a survival signal is merely not sent, the processor 30 determines that it is possible to continuously control the control target $18_n$ connected to the abnormal PLC $14_n$.

When determining in step S24 that it is possible to continuously control the control target $18_n$ connected to the abnormal PLC $14_n$, the processor 20 writes selection information of the logical value "1" in the frame (the frame including the second output data) outputted to the abnormal PLC $14_n$, and transmits the frame to the abnormal PLC $14_n$ (step S25). The second output data outputted to this abnormal PLC $14_n$ is output data obtained when the PC 12 or the other PLC $14_n$ executes the other program Pn for controlling the control target $18_n$ connected to the abnormal PLC $14_n$ via the I/O device $16_n$. By adding the selection information of the logical value "1" to this frame, it is possible to output the second output data to the control target $18_n$ connected to the abnormal PLC $14_n$ via the I/O device $16_n$. Then, the normal PLCs $14_n$ other than the abnormal PLC $14_n$ can control the control target $18_n$ connected to the abnormal PLC $14_n$. Consequently, even when the control subject that controls the control target $18_n$ is switched, it is possible to output data that does not contradict execution results obtained so far, to the I/O device $16_n$ connected to the abnormal PLC $14_n$. That is, while continuing controlling the control target $18_n$ in a stable state, it is possible to switch the control subject of the control target $18_n$.

In a case of, for example, a state shown in FIG. 10, it is determined in step S22 that the PLC $14_3$ is abnormal, and it is determined in step S23 that the PC 12 executes the other program P3 in parallel. When it is determined in step S24 that it is possible to continuously control the control target $18_3$, the PC 12 writes the selection information of the logical value "1" in the frame and transmits the frame to the abnormal PLC $14_3$ in step S25. By so doing, even when an abnormality occurs in the PLC $14_n$, the PC 12 or the other normal PLC $14_n$ can continuously control the control target $18_n$ connected to the abnormal PLC $14_n$. Principally as described above, the PC 12 transmits the frame in which the selection information of the logical value "0" is written, to the normal PLC $14_n$ than the abnormal PLC $14_n$.

Meanwhile, when determining in step S23 that the self-assigned program Pn allocated to the abnormal PLC $14_n$ is not executed by the PC 12 or the other normal PLC $14_n$ as the other program Pn in parallel or when determining in step S24 that it is not possible to continuously control the control target $18_n$ connected to the abnormal PLC $14_n$, the processor 20 causes a display unit (e.g., a liquid crystal display) that is not shown to display this determination in step S26. That is, the display unit displays an error. Further, the processor 20 may output a warning sound from a speaker that is not shown.

Figure 14:
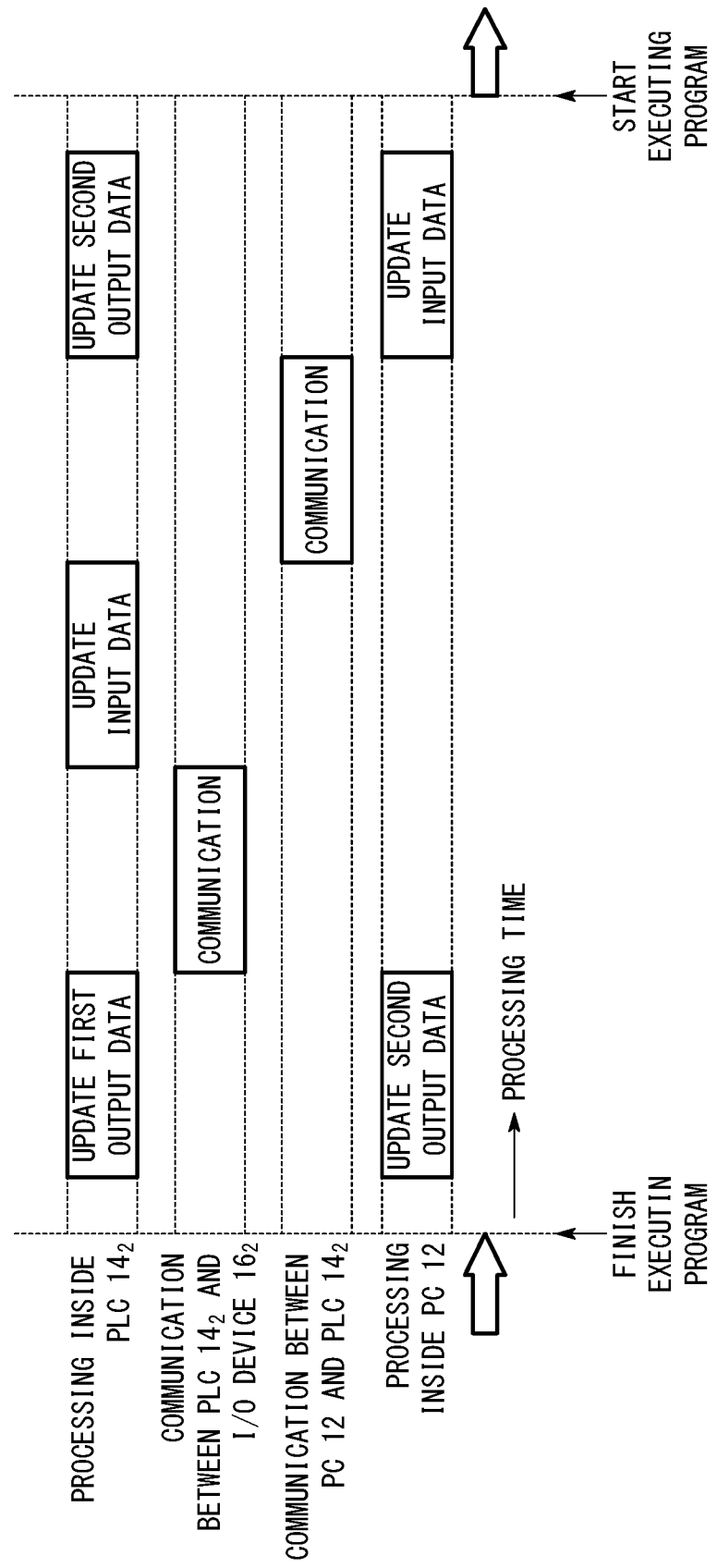
FIG. 14 is a time chart showing processing of data delivery between a normal PLC and the PC, and between the normal PLC and an I/O device connected to the normal PLC.
Figure 15:
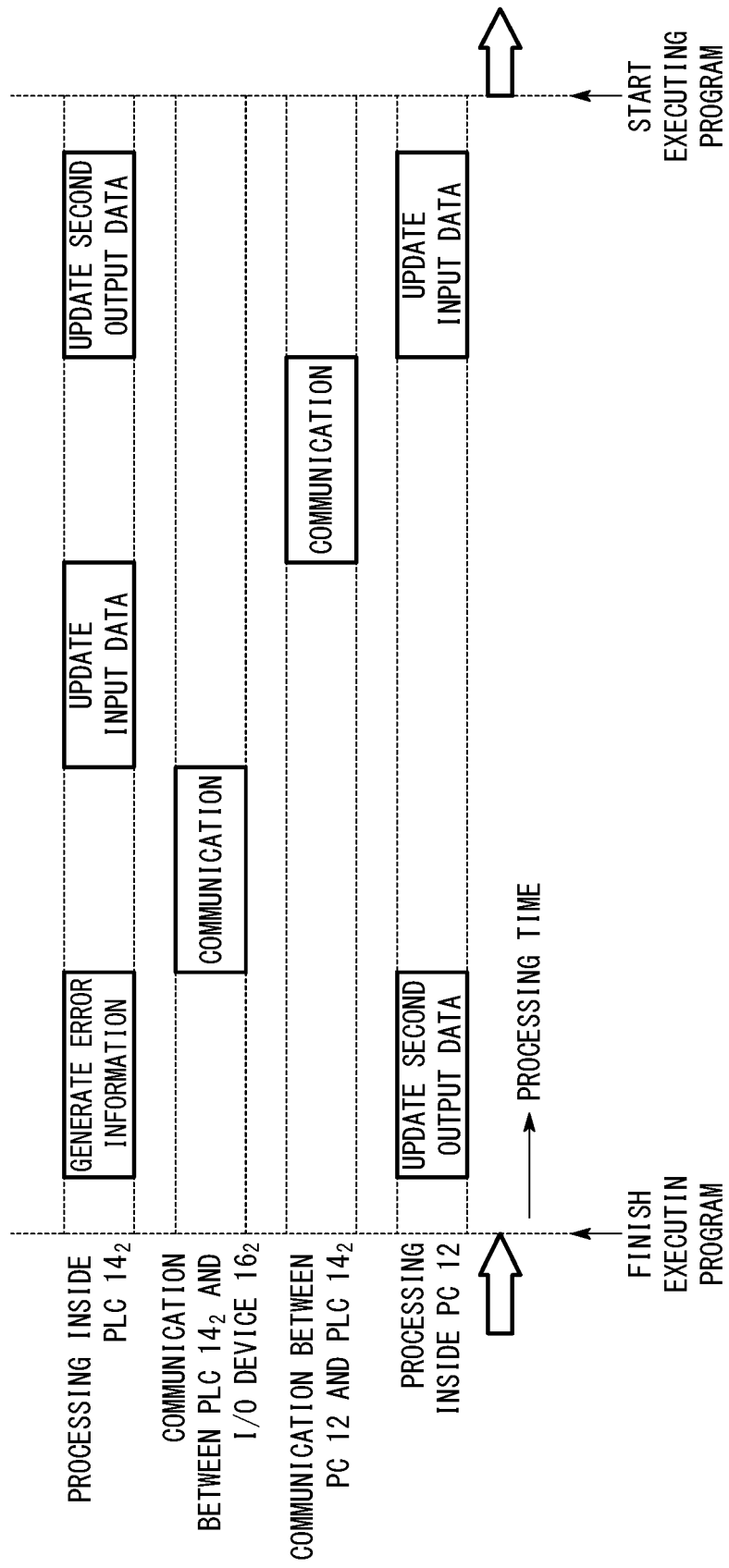
FIG. 15 is a time chart showing processing of data delivery between an abnormal PLC and the PC, and between the abnormal PLC and an I/O device connected to the abnormal PLC.

Next, processing of data delivery between the normal PLC $14_n$ and the I/O device $16_n$ connected to the PC 12 and the normal PLC $14_n$ will be described with reference to a time chart shown in FIG. 14. Subsequently, processing of data delivery between the abnormal PLC $14_n$ and the I/O device $16_n$ connected to the PC 12 and the abnormal PLC $14_n$ will be described with reference to the time chart shown in FIG. 15. In FIGS. 14 and 15, the normal PLC $14_n$ and the abnormal PLC $14_n$ are both PLCs $14_2$ for ease of description. Hence, the I/O device $16_n$ connected to the PLC $14_2$ is the I/O device $16_2$. The PC 12 writes selection information in the frame including the second output data transmitted to the PLC $14_2$.

Only execution of the program P2 will be described with reference to FIGS. 14 and 15. That is, the program P2 is the self-assigned program P2 for the PLC $14_2$, and the other program P2 for the PC 12 (see FIG. 7). The PC 12 and the PLC $14_2$ start communication at a stage at which execution of the program P2 is finished and all items of output data are determined. After receiving all items of input data from the I/O device $16_2$, the PC 12 and the PLC $14_2$ start executing the program P2 in a next execution cycle. After the PLC $14_2$ and the I/O device $16_2$ finish communications, the PC 12 and the PLC $14_2$ perform communication. In this case, by providing the PC 12 and the PLC $14_2$ with clocks that indicate the same time and are not shown, it is possible to synchronize the PC 12 and the PLC $14_2$.

<Communication Between Normal PLC $14_2$ and I/O Device $16_2$ (See FIG. 14)>

The processor 30 of the PLC $14_2$ finishes executing the self-assigned program P2 of one execution cycle, and then stores in the main memory 32 the first output data generated by executing the self-assigned program P2. The processor 30 of the PLC $14_2$ stores the first output data stored in the main memory 32, in the first output buffer memory 46 of the communication unit 34. By this means, the first output data stored in the main memory 32 and the first output buffer memory 46 is updated. This self-assigned program P2 is executed based on the input data currently stored in the first input buffer memory 42.

Subsequently, the communication unit 34 of the PLC $14_2$ writes in the frame the first output data stored in the first output buffer memory 46, and transmits the frame to the I/O device $16_2$ (a logical value stored in the register 58 is "0"). By this means, the first output data is outputted to the control target $18_2$ via the I/O device $16_2$. The communication unit 34 of the PLC $14_2$ receives the frame including the input data transmitted from the I/O device $16_2$ (control target $18_2$), extracts the input data from the received frame, and stores the input data in the first input buffer memory 42. Subsequently, the processor 30 of the PLC $14_2$ stores in the main memory 32 the input data stored in the first input buffer memory 42. By this means, the input data (the input data transmitted from the I/O device $16_2$) stored in the first input buffer memory 42 and the main memory 32 is updated. The processor 30 of the PLC $14_2$ starts executing the self-assigned program P2 at an arrival timing of the next execution cycle.

<Communication Between PC 12 and Normal PLC $14_2$ (See FIG. 14>

The processor 20 of the PC 12 finishes executing the other program P2 of one execution cycle, and then stores in the main memory 22 the second output data generated by executing the other program P2. The processor 20 of the PC 12 stores the second output data stored in the main memory 22, in the output buffer memory 84 of the communication unit 24. By this means, the second output data (the second output data outputted to the I/O device $16_2$) stored in the main memory 22 and the output buffer memory 84 is updated. The other program P2 is executed based on the input data (the input data transmitted from the I/O device $16_2$) currently stored in the input buffer memory 82.

Subsequently, the communication unit 24 of the PC 12 writes in the frame the second output data stored in the output buffer memory 84, and transmits the frame to the PLC $14_2$. In this case, the PC 12 writes selection information of a logical value "0", too, in the frame including the second output data transmitted to the PLC $14_2$, and transmits the frame. The communication unit 34 of the PLC $14_2$ extracts the second output data (second output data outputted to the I/O device $16_2$) from the frame sent from the PC 12, and stores the extracted second output data in the second output buffer memory 48. By this means, the second output data (the second output data outputted to the I/O device $16_2$) stored in the second output buffer memory 48 is updated. The communication unit 34 of the PLC $14_2$ extracts the selection information from the frame sent from the PC 12, and stores the logical value "0" of the extracted selection information in the register 58. By this means, the selector 56 of the PLC $14_2$ selects the first output data stored in the first output buffer memory 46 as the output data transmitted to the I/O device $16_2$.

The communication unit 34 of the PLC $14_2$ writes in the frame the input data stored in the first input buffer memory 42, and transmits the frame to the PC 12. The communication unit 24 of the PC 12 receives the frame including the input data (the input data transmitted from the I/O device $16_2$) sent from the PLC $14_2$, extracts the input data from the received frame, and stores the input data in the input buffer memory 82. The processor 20 of the PC 12 stores in the main memory 22 the input data stored in the input buffer memory 82. By this means, the input data (the input data transmitted from the I/O device $16_2$) stored in the input buffer memory 82 and the main memory 22 is updated. The processor 20 of the PC 12 starts executing the other program P2 at an arrival timing of a next execution cycle.

<Communication Between Abnormal PLC $14_2$ and I/O Device $16_2$ (See FIG. 15)>

When detecting an error, the processor 30 of the abnormal PLC $14_2$ generates error information, and transmits the generated error information to the PC 12 via the above dedicated line. In this case, the processor 30 of the abnormal PLC $14_2$ does not execute the self-assigned program P2, and therefore the first output data stored in the first output buffer memory 46 is not updated.

The communication unit 34 of the abnormal PLC $14_2$ writes in the frame the first output data stored in the first output buffer memory 46, and transmits the frame to the I/O device $16_2$ (the logical value stored in the register 58 in this case is "0"). At this time, the first output data stored in the first output buffer memory 46 is not updated, and therefore the previously transmitted first output data is retransmitted to the I/O device $16_2$. The communication unit 34 of the abnormal PLC $14_2$ receives the frame including the input data transmitted from the I/O device $16_2$, extracts the input data from the received frame, and stores the input data in the first input buffer memory 42. Subsequently, the processor 30 of the abnormal PLC $14_2$ stores in the main memory 32 the input data stored in the first input buffer memory 42. By this means, the input data (the input data transmitted from the I/O device $16_2$) stored in the first input buffer memory 42 and the main memory 32 is updated.

<Communication Between PC 12 and Abnormal PLC $14_2$ (See FIG. 15)>

The processor 20 of the PC 12 finishes executing the other program P2 of one execution cycle, and then stores in the main memory 22 the second output data generated by executing the other program P2. The processor 20 of the PC 12 stores the second output data stored in the main memory 22, in the output buffer memory 84 of the communication unit 24. By this means, the second output data (the second output data outputted to the I/O device $16_2$) stored in the main memory 22 and the output buffer memory 84 is updated. In this regard, the other program P2 is executed based on the input data (the input data transmitted from the I/O device $16_2$) currently stored in the input buffer memory 82.

Subsequently, the communication unit 24 of the PC 12 writes in the frame the second output data stored in the output buffer memory 84, and transmits the frame to the abnormal PLC $14_2$. In this case, the PC 12 writes the selection information of the logical value "1", too, in the frame including the second output data transmitted to the abnormal PLC $14_2$, and transmits the frame. The communication unit 34 of the abnormal PLC $14_2$ extracts the second output data (the second output data outputted to the I/O device $16_2$) from the frame sent from the PC 12, and stores the extracted second output data in the second output buffer memory 48. By this means, the second output data (the second output data outputted to the I/O device $16_2$) stored in the second output buffer memory 48 is updated. The communication unit 34 of the abnormal PLC $14_2$ extracts the selection information from the frame sent from the PC 12, and stores the logical value "1" of the extracted selection information in the register 58. By this means, the selector 56 of the abnormal PLC $14_2$ selects the second output data stored in the second output buffer memory 48 as the output data transmitted to the I/O device $16_2$. Hence, when the PLC $14_2$ and the I/O device $16_2$ communicate next time, the second output data stored in the second output buffer memory 48 is outputted to the I/O device $16_2$. Consequently, it is possible to switch the control subject that controls the I/O device $16_2$ from the abnormal PLC $14_2$ to the PC 12.

The communication unit 34 of the abnormal PLC $14_2$ writes in the frame the input data stored in the first input buffer memory 42, and transmits the frame to the PC 12. The communication unit 24 of the PC 12 receives the frame including the input data (the input data transmitted from the I/O device $16_2$) sent from the abnormal PLC $14_2$, extracts the input data from the received frame, and stores the input data in the input buffer memory 82. The processor 20 of the PC 12 stores in the main memory 22 the input data stored in the input buffer memory 82. The input data (the input data transmitted from the I/O device $16_2$) stored in the input buffer memory 82 and the main memory 22 is updated. The processor 20 of the PC 12 starts executing the other program P2 of an arriving next execution cycle.

Thus, when an abnormality occurs in the PLC $14_2$, the control subjects that control the I/O device $16_2$ are switched from the abnormal PLC $14_2$ to the PC 12. However, a response (update) of the output data to the input data from the I/O device $16_2$ delays by one execution cycle compared to a normal time. To avoid this delay, after the second output buffer memory 48 of the abnormal PLC $14_2$ is updated, the abnormal PLC $14_2$ and the I/O device $16_2$ may communicate once again in the current execution cycle.

An example of data delivery between the PLC $14_n$ and the PC 12 to which the self-assigned program Pn of the PLC $14_n$ has been allocated as the other program Pn has been described with reference to FIGS. 14 and 15. However, data delivery between one PLC $14_n$ and the other PLC $14_n$ to which the self-assigned program Pn of the one PLC $14_n$ has been allocated as the other program Pn can be performed likewise. Processing of data delivery between the PLC $14_1$ and the PLC $14_4$ will be briefly described with reference to FIGS. 14 and 15. The PLC $14_2$ and PC 12 in FIGS. 14 and 15 are replaced with the PLC $14_1$ and the PLC $14_4$, and only execution of the program P1 will be described.

<Communication Between Normal PLC $14_1$ and I/O Device $16_1$ (See FIG. 14)>

The processor 30 of the PLC $14_1$ finishes executing the self-assigned program P1 (see FIG. 7) of one execution cycle, and then stores in the main memory 32 the first output data generated by executing the self-assigned program P1. The processor 30 of the PLC $14_1$ stores the first output data stored in the main memory 32, in the first output buffer memory 46 of the communication unit 34. By this means, the first output data stored in the main memory 32 and the first output buffer memory 46 is updated. In this regard, this self-assigned program P1 is executed based on the input data currently stored in the first input buffer memory 42.

Subsequently, the communication unit 34 of the PLC $14_1$ writes in the frame the first output data stored in the first output buffer memory 46, and transmits the frame to the I/O device $16_1$ (the logical value stored in the register 58 is "0"). By this means, the first output data is outputted to the control target $18_1$ via the I/O device $16_1$. The communication unit 34 of the PLC $14_1$ receives the frame including the input data transmitted from the I/O device $16_1$ (control target $18_1$), extracts the input data from the received frame, and stores the input data in the first input buffer memory 42. Subsequently, the processor 30 of the PLC $14_1$ stores in the main memory 32 the input data stored in the first input buffer memory 42. By this means, the input data (the input data transmitted from the I/O device $16_1$) stored in the first input buffer memory 42 and the main memory 32 is updated. The processor 30 of the PLC $14_1$ starts executing the self-assigned program P1 at an arrival timing of a next execution cycle.

<Communication Between Normal PLC $14_1$ and Normal PLC $14_4$ (See FIG. 14>

The processor 30 of the PLC $14_4$ finishes executing the other program P1 (see FIG. 7) of one execution cycle, and then stores in the main memory 32 the second output data generated by executing the other program P1. The processor 30 of the PLC $14_4$ stores the second output data stored in the main memory 32, in the third output buffer memory 50 of the communication unit 34. By this means, the second output data (the second output data outputted to the I/O device $16_1$) stored in the main memory 32 and the third output buffer memory 50 is updated. In this regard, the other program P1 is executed based on the input data (the input data transmitted from the I/O device $16_1$) currently stored in the second input buffer memory 44.

Subsequently, the communication unit 34 of the PLC $14_4$ writes in the frame the second output data stored in the third output buffer memory 50, and transmits the frame to the PLC $14_1$ via the PC 12. In this case, the PC 12 writes the selection information of the logical value "0", too, in the frame including the second output data transmitted to the PLC $14_1$. The communication unit 34 of the PLC $14_1$ extracts the second output data (the second output data outputted to the I/O device $16_1$) from the frame sent from the PLC $14_4$, and stores the extracted second output data in the second output buffer memory 48. By this means, the second output data (the second output data outputted to the I/O device $16_1$) stored in the second output buffer memory 48 is updated. The communication unit 34 of the PLC $14_1$ extracts the selection information from the frame sent from the PLC $14_4$ via the PC 12, and stores the logical value "0" of the extracted selection information in the register 58. By this means, the selector 56 of the PLC $14_1$ selects the first output data stored in the first output buffer memory 46 as the output data transmitted to the I/O device $16_1$.

The communication unit 34 of the PLC $14_1$ writes in the frame the input data stored in the first input buffer memory 42, and transmits the frame to the PLC $14_4$ via the PC 12. The communication unit 34 of the PLC $14_4$ receives the frame including the input data (the input data transmitted from the I/O device $16_1$) sent from the PLC $14_1$ via the PC 12, extracts the input data from the received frame, and stores the input data in the second input buffer memory 44. The processor 30 of the PLC $14_4$ stores in the main memory 32 the input data stored in the second input buffer memory 44. By this means, the input data (the input data transmitted from the I/O device $16_1$) stored in the second input buffer memory 44 and the main memory 32 is updated. The processor 30 of the main memory 32 starts executing the other program P1 at an arrival of the next execution cycle.

<Communication Between Abnormal PLC $14_1$ and I/O Device $16_1$ (See FIG. 15)>

When detecting an error, the processor 30 of the abnormal PLC $14_1$ generates error information, and transmits the generated error information to the PC 12 via the above dedicated line. In this case, the processor 30 of the abnormal PLC $14_1$ does not execute the self-assigned program P1, and therefore the first output data stored in the first output buffer memory 46 is not updated.

The communication unit 34 of the abnormal PLC $14_1$ writes in the frame the first output data stored in the first output buffer memory 46, and transmits the frame to the I/O device $16_1$ (the logical value stored in the register 58 in this case is "0"). In this case, the first output data stored in the first output buffer memory 46 is not updated, and therefore the previously transmitted first output data is retransmitted to the I/O device $16_1$. The communication unit 34 of the abnormal PLC $14_1$ receives the frame including the input data transmitted from the I/O device $16_1$, extracts the input data from the received frame, and stores the input data in the first input buffer memory 42. Subsequently, the processor 30 of the abnormal PLC $14_1$ stores in the main memory 32 the input data stored in the first input buffer memory 42. By this means, the input data (the input data transmitted from the I/O device $16_1$) stored in the first input buffer memory 42 and the main memory 32 is updated.

<Communication Between Abnormal PLC $14_1$ and Normal PLC $14_4$ (See FIG. 15)>

The processor 30 of the PLC $14_4$ finishes executing the other program P1 of one execution cycle, and stores in the main memory 32 the second output data generated by executing the other program P1. The processor 30 of the PLC $14_4$ stores the second output data stored in the main memory 32, in the third output buffer memory 50 of the communication unit 34. Thus, the second output data (the second output data outputted to the I/O device $16_1$) stored in the main memory 32 and the third output buffer memory 50 is updated. In this regard, the other program P1 is executed based on the input data (the input data transmitted from the I/O device $16_1$) currently stored in the second input buffer memory 44.

Subsequently, the communication unit 34 of the PLC $14_4$ writes in the frame the second output data stored in the third output buffer memory 50, and transmits the frame to the abnormal PLC $14_1$ via the PC 12. At this time, the PC 12 writes the selection information of the logical value "1", too, in the frame including the second output data transmitted to the abnormal PLC $14_1$, and transmits the frame. The communication unit 34 of the abnormal PLC $14_1$ extracts the second output data (the second output data outputted to the I/O device $16_1$) from the frame sent from the PLC $14_4$ via the PC 12, and stores the extracted second output data in the second output buffer memory 48. By this means, the second output data (the second output data outputted to the I/O device $16_1$) stored in the second output buffer memory 48 is updated. The communication unit 34 of the abnormal PLC $14_1$ extracts the selection information from the frame sent from the PLC $14_4$ via the PC 12, and stores the logical value "1" of the extracted selection information in the register 58. Thus, the selector 56 of the abnormal PLC $14_1$ selects the second output data stored in the second output buffer memory 48 as the output data transmitted to the I/O device $16_1$. Hence, when the PLC $14_1$ and the I/O device $16_1$ communicate next time, the second output data stored in the second output buffer memory 48 is outputted to the I/O device $16_1$. Consequently, it is possible to switch the control subject that controls the I/O device $16_1$ from the abnormal PLC $14_1$ to the PLC $14_4$.

The communication unit 34 of the abnormal PLC $14_1$ writes in the frame the input data stored in the first input buffer memory 42, and transmits the frame to the PLC $14_4$ via the PC 12. The communication unit 34 of the PLC $14_4$ receives the frame including the input data (the input data transmitted from the I/O device $16_1$) sent from the abnormal PLC $14_1$ via the PC 12, extracts the input data from the received frame, and stores the input data in the second input buffer memory 44. The processor 30 of the PLC $14_4$ stores in the main memory 32 the input data stored in the second input buffer memory 44. The input data (the input data transmitted from the I/O device $16_1$) stored in the second input buffer memory 44 and the main memory 32 is updated. The processor 30 of the PLC $14_4$ starts executing the other program P1 of an arriving next execution cycle.

Thus, when an abnormality occurs in the PLC $14_1$, the control subjects that control the I/O device $16_1$ are switched. However, a response (update) of the output data to the input data from the I/O device $16_1$ delays by one execution cycle compared to a normal time. To avoid this delay, after the second output buffer memory 48 is updated, the abnormal PLC $14_1$ and the I/O device $16_1$ may communicate once again in the current execution cycle.

The first input buffer memory 42 and the second input buffer memory 44 may be configured as one storage medium. In this case, a storage area of one storage medium may be partitioned into at least two to cause one storage area to function as the first input buffer memory 42 and the other storage area to function as the second input buffer memory 44. Similarly, the first output buffer memory 46, the second output buffer memory 48 and the third output buffer memory 50 may also be configured as one storage medium. In this case, too, a storage area of one storage medium may be partitioned into at least three to cause each of the three partitioned storage areas to respectively function as the first output buffer memory 46, the second output buffer memory 48 and the third output buffer memory 50. Further, the first input buffer memory 42, the second input buffer memory 44, the first output buffer memory 46, the second output buffer memory 48 and the third output buffer memory 50 may be configured as one storage medium.

When an abnormality occurs in the PLC $14_n$, the control subject that controls the control target $18_n$ connected to the abnormal PLC $14_n$ via the I/O device $16_n$ is switched. However, even when the abnormality does not occur in the PLC $14_n$, the control subject may be switched. That is, the control subject may be switched to cause the PC 12 or another normal PLC $14_n$ to control the control target $18_n$ connected to the normal PLC $14_n$ via the I/O device $16_n$.

The PLC system (controller system) 10 described in the above embodiment includes the plurality of PLCs (controllers) $14_n$, the plurality of I/O devices $16_n$ that connect the control target $18_n$ of each of the plurality of PLCs $14_n$ and each of the plurality of PLCs $14_n$, and transmit necessary information between the control target $18_n$ and the PLC $14_n$, and the PC (higher level control device) 12 that controls and manages the plurality of PLCs $14_n$. The PC 12 includes the main memory (storage unit) 22 and the processor 20. The main memory 22 stores the plurality of programs Pn executed by each of the plurality of PLCs $14_n$. The processor 20 allocates each of the plurality of programs Pn stored in the main memory 22 as the self-assigned program Pn to each of the plurality of PLCs $14_n$ to cause each of the plurality of PLCs $14_n$ to control the control target $18_n$ connected to each PLC $14_n$ via the I/O device $16_n$. The processor 20 further allocates all or part of the plurality of programs Pn as the other programs Pn to the PC 12 and the plurality of PLCs $14_n$ to cause the PC 12 and the plurality of PLCs $14_n$ to doubly execute all or part of the plurality of programs Pn stored in the main memory 22 in parallel in one execution cycle. Each of the plurality of PLCs $14_n$ includes the first input buffer memory 42, the first output buffer memory 46 and the second output buffer memory 48. The first input buffer memory 42 stores input data transmitted from the control target $18_n$ connected to each PLC $14_n$ via the I/O device $16_n$. The first output buffer memory 46 stores the first output data obtained by executing the self-assigned program Pn allocated to each PLC $14_n$ to control the control target $18_n$ connected to each PLC $14_n$ via the I/O device $16_n$. The second output buffer memory 48 stores the second output data obtained when the PC 12 or the other PLC $14_n$ executes the other program Pn allocated to the PC 12 or the other PLC $14_n$ to control the control target $18_n$ connected to the PLC $14_n$ other than the PC 12 or the other PLC $14_n$ via the I/O device $16_n$. Each of the plurality of PLCs $14_n$ outputs one of the first output data stored in the first output buffer memory 46 and the second output data stored in the second output buffer memory 48, to the control target $18_n$ connected to each PLC $14_n$ via the I/O device $16_n$ based on the selection information transmitted from the PC 12.

Consequently, even when the control subject that controls the control target $18_n$ is switched, it is possible to output data that does not contradict execution results obtained so far, to the I/O device $16_n$ connected to this control target $18_n$. Consequently, while continuing controlling the control target $18_n$ in a stable state, it is possible to switch the control subjects of the control target $18_n$.

Each of the plurality of PLCs $14_n$ further includes the processor 30. The processor 30 generates the first output data by executing the self-assigned program Pn allocated to each PLC $14_n$ based on the input data transmitted from the control target $18_n$ connected to each PLC $14_n$ via the I/O device $16_n$. Each of the plurality of PLCs $14_n$ generates the second output data by executing the other program Pn allocated to each PLC $14_n$ based on the input data transmitted from the control target $18_n$ that is connected to the other PLC $14_n$ via the I/O device $16_n$ and is controlled according to the other program Pn allocated to each PLC $14_n$. Thus, the PLC $14_n$ executes the program Pn (the self-assigned program Pn or the other program Pn) based on the input data transmitted from the control target $18_n$ and generates the output data outputted to the control target $18_n$ that has transmitted the input data. Consequently, it is possible to control the control target $18_n$ in a stable state.

The processor 20 of the PC 12 generates the second output data by executing the other program Pn allocated to the PC 12 based on the input data transmitted from the control target $18_n$ controlled according to the other program Pn allocated to the PC 12. Thus, the PC 12 executes the other program Pn based on the input data transmitted from the control target $18_n$ and generates the output data outputted to the control target $18_n$ that has transmitted the input data. Consequently, it is possible to control the control target $18_n$ in the stable state.

The processor 20 of the PC 12 outputs selection information to the plurality of PLCs $14_n$ to cause the PLC $14_n$ determined as a normal PLC to output the first output data stored in the first output buffer memory 46 to the control target $18_n$ connected to each PLC $14_n$ via the I/O device $16_n$, and cause the PLC $14_n$ determined as an abnormal PLC $14_n$ to output the second output data stored in the second output buffer memory 48 to the control target $18_n$ connected to the abnormal PLC $14_n$ via the I/O device $16_n$. Consequently, even when an abnormality occurs in the PLC $14_n$, in place of the abnormal PLC $14_n$, the other normal PLC $14_n$ can control the control target $18_n$ connected to the abnormal PLC $14_n$ via the I/O device $16_n$. While continuing controlling the control target $18_n$ connected to the abnormal PLC $14_n$ via the I/O device $16_n$ in the stable state, it is possible to switch the control subjects of the control target $18_n$ connected to the abnormal PLC $14_n$.

The processor 20 of the PC 12 determines whether each of the plurality of PLCs $14_n$ is normal or abnormal based on at least one of error information and a survival signal of each of the plurality of PLCs $14_n$ obtained from the plurality of PLCs $14_n$. Thus, the PC 12 can precisely determine whether the PLC $14_n$ is normal or abnormal.

The communication unit 34 of the PLC $14_n$ further includes the selector 56 that selects one of the first output data stored in the first output buffer memory 46 and the second output data stored in the second output buffer memory 48 as the output data outputted to the control target $18_n$ connected to each PLC $14_n$ via the I/O device $16_n$. Consequently, it is possible to easily switch the output data outputted to the I/O device $16_n$.

The processor 20 of the PC 12 obtains load information indicating a load applied when each of the plurality of PLCs 14 executes the self-assigned program Pn, via the communication units 34 of the plurality of PLCs $14_n$, and allocates the other program Pn based on the obtained load information. Consequently, it is possible to allocate the other program Pn to cause each of the plurality of PLCs $14_n$ to finish the processing of the program Pn in one execution cycle.

The PC 12 receives the input data stored in the first input buffer memory 42 of the PLC $14_n$ connected via the I/O device $16_n$ to the control target $18_n$ controlled according to the other program Pn allocated to each PLC $14_n$, and transmits the second output data to the PLC $14_n$ connected via the I/O device $16_n$ to the control target $18_n$ controlled according to the other program Pn allocated to each PLC $14_n$. Consequently, the PC 12 can transmit to the PLC $14_n$ the second output data that does not contradict execution results obtained so far, and control the control target $18_n$ connected to the PLC $14_n$ via the I/O device $16_n$.

Each of the plurality of PLCs $14_n$ further includes the second input buffer memory 44 and the third output buffer memory 50. The second input buffer memory 44 stores the input data transmitted from the control target $18_n$ that is connected to the other PLC $14_n$ via the I/O device $16_n$ and is controlled according to the other program Pn allocated to each PLC $14_n$. The third output buffer memory 50 stores the second output data obtained by executing the other program Pn allocated to each PLC $14_n$ to control the control target $18_n$ connected to the other PLC $14_n$ via the I/O device $16_n$. Each of the plurality of PLCs $14_n$ receives via the PC 12 the input data stored in the first input buffer memory 42 of the other PLC $14_n$ connected via the I/O device $16_n$ to the control target $18_n$ controlled according to the other program Pn allocated to each PLC $14_n$, and stores the received input data in the second input buffer memory 44. Each of the plurality of PLC $14_n$ transmits the second output data stored in the third output buffer memory 50 via the PC 12 to the other PLC $14_n$ connected via the I/O device $16_n$ to the control target $18_n$ controlled according to the other program Pn allocated to each PLC $14_n$. Consequently, the PLC $14_n$ can transmit to the other PLC $14_n$ the second output data that does not contradict execution results obtained so far, and control the control target $18_n$ connected to the other PLC $14_n$ via the I/O device $16_n$.

What is claimed is:

1. A controller system, comprising:
a plurality of controllers;
a plurality of I/O devices each configured to connect a control target of each of the plurality of controllers and each of the plurality of controllers, and transmit information between the control target and each of the controllers; and
a control device configured to control and manage the plurality of controllers, wherein:
the control device includes:
a storage unit configured to store each of a plurality of programs executed by each of the plurality of controllers, and
a processor configured to allocate each of the plurality of programs stored in the storage unit as a self-assigned program to each of the plurality of controllers to cause each of the plurality of controllers to control the control target connected to each controller via the I/O device, and further allocate all or part of the plurality of programs as another program to the control device and the plurality of controllers to cause the control device and the plurality of controllers to doubly execute the all or part of the plurality of programs stored in the storage unit in parallel in one execution cycle,
each controller of the plurality of controllers includes a communication unit including:
a first input buffer memory configured to store input data transmitted from the control target connected to said each controller via the I/O device,
a first output buffer memory configured to store first output data obtained by executing the self-assigned program allocated to said each controller to control the control target connected to said each controller via the I/O device, and
a second output buffer memory configured to store second output data obtained when the control device or another of the controllers executes the other program allocated to the control device or the other of the controllers to control the control target connected to said each controller via the I/O device,
wherein said each controller is configured to output one of the first output data and the second output data to the control target connected to said each controller via the I/O device, based on selection information transmitted from the control device, the first output data being stored in the first output buffer memory, the second output data being stored in the second output buffer memory, the second output buffer memory of at least one controller of the plurality of controllers stores the second output data obtained when another controller of the plurality of controllers executes the other program allocated to said another controller to control the control target connected to the at least one controller via the I/O device, the processor of the control device is configured to
obtain load information via the communication unit of the plurality of controllers, and
allocate the other program based on an acceptable load that can be further processed in one execution cycle and that is calculated from the obtained load information, the load information indicating a load applied when each of the plurality of controllers executes the self-assigned program, each of the plurality of controllers has a same processing performance as other controllers among the plurality of controllers, and the control device has a processing performance higher than the processing performance of each of the plurality of controllers.

2. The controller system according to claim 1, wherein said each controller further includes a processor configured to
generate the first output data by executing the self-assigned program allocated to said each controller based on the input data transmitted from the control target connected to said each controller via the I/O device, and
generate the second output data by executing the other program allocated to said each controller based on the input data transmitted from the control target connected to the other of the controllers via the I/O device and controlled according to the other program allocated to said each controller.

3. The controller system according to claim 1, wherein the processor of the control device is configured to generate the second output data by executing the other program allocated to the control device based on the input data transmitted from the control target controlled according to the other program allocated to the control device.

4. The controller system according to claim 1, wherein the processor of the control device is configured to
output the selection information to the plurality of controllers to cause one of the controllers determined as a normal controller to output the first output data stored in the first output buffer memory to the control target connected to the normal controller via the I/O device, and
cause another of the controllers determined as an abnormal controller to output the second output data stored in the second output buffer memory to the control target connected to the abnormal controller via the I/O device.

5. The controller system according to claim 4, wherein the processor of the control device is configured to determine whether each of the plurality of controllers is normal or abnormal based on at least one of error information and a survival signal of each of the plurality of controllers obtained from the plurality of controllers.

6. The controller system according to claim 1, wherein the communication unit of said each controller further includes a selector configured to select one of the first output data and the second output data as output data based on the selection information, the first output data being stored in the first output buffer memory, the second output data being stored in the second output buffer memory, and the output data being outputted to the control target connected to said each controller via the I/O device.

7. The controller system according to claim 1, wherein the other of the controllers is configured to:
receive the input data stored in the first input buffer memory of said each controller connected via the I/O device to the control target controlled according to the other program allocated to the other of the controllers, and
transmit the second output data to said each controller connected via the I/O device to the control target controlled according to the other program allocated to the other of the controllers.

8. The controller system according to claim 1, wherein said each controller further includes:
a second input buffer memory configured to store the input data transmitted from the control target connected to another one of the controllers via the I/O device and controlled according to the other program allocated to said each controller, and
a third output buffer memory configured to store the second output data obtained by executing the other program allocated to said each controller to control the control target connected to the other one of the controllers via the I/O device, and said each controller is configured to
receive the input data via the control device, the input data being stored in the first input buffer memory of the other one of the controllers connected via the I/O device to the control target controlled according to the other program allocated to said each controller,
store the received input data in the second input buffer memory, and
transmit the second output data to the other one of the controllers via the control device, the second output data being stored in the third output buffer memory, and the other one of the controllers being connected via the I/O device to the control target controlled according to the other program allocated to said each controller.

9. A control method of a controller system that comprises:
a plurality of controllers;
a plurality of I/O devices each configured to connect a control target of each of the plurality of controllers to each of the plurality of controllers, and transmit information between the control target and each of the controllers; and
a control device configured to control and manage the plurality of controllers, wherein:
the control device includes a storage unit configured to store each of a plurality of programs executed by each of the plurality of controllers, and
each of the plurality of controllers includes a communication unit including a first input buffer memory, a first output buffer memory and a second output buffer memory,
the control method comprising:
an allocating step of, at the control device, allocating each of the plurality of programs stored in the storage unit as a self-assigned program to each of the plurality of controllers to cause each of the plurality of controllers to control the control target connected to each controller via the I/O device, and further allocating all or part of the plurality of programs as another program to the control device and the plurality of controllers to cause the control device and the plurality of controllers to doubly execute the all or part of the plurality of programs stored in the storage unit in parallel in one execution cycle;

a first inputting/storing step of, at each controller of the plurality of controllers, storing input data in the first input buffer memory, the input data being transmitted from the control target connected to said each controller via the I/O device;

a first outputting/storing step of, at said each controller, storing first output data in the first output buffer memory, the first output data being obtained by executing the self-assigned program allocated to said each controller to control the control target connected to said each controller via the I/O device;

a second outputting/storing step, at said each controller, storing second output data in the second output buffer memory, the second output data being obtained when the control device or another of the controllers executes the other program allocated to the control device or the other controller to control the control target connected to said each controller via the I/O device; and an outputting step of, at said each controller, outputting one of the first output data and the second output data to the control target connected to said each controller via the I/O device, based on selection information transmitted from the control device, the first output data being stored in the first output buffer memory, the second output data being stored in the second output buffer memory, wherein the second output buffer memory of at least one controller of the plurality of controllers stores the second output data obtained when another controller of the plurality of controllers executes the other program allocated to said another controller to control the control target connected to the at least one controller via the I/O device, wherein the control method further comprises an obtaining step of, at the control device, obtaining load information via the communication unit of the plurality of controllers, wherein, in the allocating step, the other program is allocated based on an acceptable load that can be further processed in one execution cycle and that is calculated from the obtained load information, the load information indicating a load applied when each of the plurality of controllers executes the self-assigned program, wherein each of the plurality of controllers has a same processing performance as other controllers among the plurality of controllers, and wherein the control device has a processing performance higher than the processing performance of each of the plurality of controllers.

10. The control method according to claim 9, further comprising:

a first generating step of, at said each controller, generating the first output data by executing the self-assigned program allocated to said each controller based on the input data transmitted from the control target connected to said each controller via the I/O device;

a second generating step of, at said each controller, generating the second output data by executing the other program allocated to said each controller based on the input data transmitted from the control target connected to another one of the controllers via the I/O device and controlled according to the other program allocated to said each controller; and a third generating step of, at the control device, generating the second output data by executing the other program allocated to the control device based on the input data transmitted from the control target controlled according to the other program allocated to the control device.

11. The control method according to claim 9, wherein:

the communication unit further includes a selector; and the control method further comprises:

an abnormality determining step of, at the control device, determining whether each of the plurality of controllers is normal or abnormal based on at least one of error information and a survival signal of the each of the plurality of controllers obtained from the plurality of controllers; and a selecting/outputting step of, at the control device, outputting the selection information to the plurality of controllers to cause one of the controllers determined as a normal controller to output the first output data stored in the first output buffer memory to the control target connected to the normal controller via the I/O device, and cause another of the controllers determined as an abnormal controller to output the second output data stored in the second output buffer memory to the control target connected to the abnormal controller via the I/O device; and a selecting step of, at the selector of the communication unit of each of the plurality of controllers, selecting one of the first output data and the second output data as output data based on the selection information, the first output data being stored in the first output buffer memory, the second output data being stored in the second output buffer memory, and the output data being outputted to the control target connected to each controller via the I/O device.

12. The control method according to claim 9, further comprising:

a receiving step of, at the control device, receiving the input data stored in the first input buffer memory of the controller connected via the I/O device to the control target controlled according to the other program allocated to the control device; and a first transmitting step of, at the control device, transmitting the second output data to the controller connected via the I/O device to the control target controlled according to the other program allocated to the control device.

13. The control method according to claim 9, wherein:

the communication unit further includes a second input buffer memory and a third output buffer memory;

the control method further comprises:

a second inputting/storing step of, at of said each controller, storing the input data in the second input buffer memory, the input data being transmitted from the control target connected to another of the controllers via the I/O device and controlled according to the other program allocated to said each controller; and a third outputting/storing step of, at said each controller, storing the second output data in the third output buffer memory, the second output data being obtained by executing the other program allocated to said each controller to control the control target connected to the other controller via the I/O device; and a second transmitting step of, at said each controller, transmitting the second output data stored in the third output buffer memory to the other controller via the control device, the other controller being connected via the I/O device to the control target controlled according to the other program allocated to said each controller; and in the second inputting/storing step, said each controller is configured to receive the input data via the control device, the input data being stored in the first input buffer memory of the other controller connected via the I/O device to the control target controlled according to the other program allocated to said each controller, and store the received input data in the second input buffer memory.

* * * * *